(12) United States Patent
Buthler

(10) Patent No.: US 10,098,139 B2
(45) Date of Patent: Oct. 9, 2018

(54) MOBILE TERMINAL DEVICES AND METHODS IN MOBILE COMMUNICATION DEVICES

(71) Applicant: Intel IP Corporation, Santa Clara, CA (US)

(72) Inventor: Jakob Buthler, Aalborg (DK)

(73) Assignee: Intel IP Corporation, Santa Clara, CA (US)

( * ) Notice: Subject to any disclaimer, the term of this patent is extended or adjusted under 35 U.S.C. 154(b) by 147 days.

(21) Appl. No.: 14/934,206

(22) Filed: Nov. 6, 2015

(65) Prior Publication Data

US 2017/0135125 A1      May 11, 2017

(51) Int. Cl.
| | |
|---|---|
| *H04W 72/12* | (2009.01) |
| *H04L 1/18* | (2006.01) |
| *H04W 76/02* | (2009.01) |
| *H04W 76/15* | (2018.01) |

(52) U.S. Cl.
CPC ........... *H04W 72/1263* (2013.01); *H04L 1/18* (2013.01); *H04W 76/15* (2018.02)

(58) Field of Classification Search
CPC .... H04W 72/1263; H04W 76/025; H04L 1/18
See application file for complete search history.

(56) References Cited

U.S. PATENT DOCUMENTS

| | | | |
|---|---|---|---|
| 9,125,230 B2 * | 9/2015 | Wu | ........................ H04W 88/06 |
| 2016/0049976 A1 * | 2/2016 | Krishnamoorthi | .. H04W 72/042 |
| | | | 455/558 |

* cited by examiner

*Primary Examiner* — Yemane Mesfin
*Assistant Examiner* — Harry Baron
(74) *Attorney, Agent, or Firm* — Viering, Jentschura & Partner mbB

(57) ABSTRACT

A mobile terminal device having a first radio connection and a second radio connection may also include a radio processing circuit configured to receive and process radio frequency signals and a baseband modem system including of one or more baseband modems, the baseband modem system configured to identify a missed subframe of the first radio connection, select a subframe from one or more additional subframes of the first radio connection during which to schedule radio activity of the second radio connection based on a probability metric for each of the one or more additional subframes, where the probability metric for each given subframe of the one or more additional subframes indicates a probability that the subframe contains a data block of the missed subframe, and perform the scheduled radio activity of the second radio connection during the selected subframe of the first radio connection.

25 Claims, 10 Drawing Sheets

MOBILE TERMINAL DEVICES AND METHODS IN MOBILE COMMUNICATION DEVICES

TECHNICAL FIELD

Various embodiments relate generally to mobile terminal devices and methods in mobile communication devices.

BACKGROUND

Mobile phone designs that incorporate multiple Subscriber Identity Modules (SIMs) have recently increased in popularity. There exist numerous variations of such multi-SIM designs, which each may allow for different degrees of operation for each included SIM. For example, straightforward designs such as Dual-Sim Dual-Standby (DSDS) designs may allow for one SIM to transmit and/or receive while the other SIM remains in standby mode. More complex designs including Dual-Receive Dual-SIM Dual-Standby (DR-DSDS) designs may allow for two SIMs to concurrently receive but only transmit on a time-sharing basis while Dual-Sim Dual-Active (DSDA) designs may allow two SIMs to simultaneously transmit and receive in parallel.

There may exist certain performance degradation in multi-SIM designs due to the presence of multiple SIMs. As previously indicated, DSDS designs may only allow active operation of one SIM at a time, while the other SIM is relegated to a passive "standby" role. Accordingly, both reception and transmission resources must be shared on a time-sharing basis, which may lead to missed transmissions and receptions for one or both SIMs. DR-DSDS designs may similarly suffer in the uplink direction due to the sharing of transmission resources between both SIMs. Furthermore, receiver desensitization in DSDA designs may occur when one SIM is transmitting simultaneous to reception activity by the other SIM.

Similar co-existence problems may arise in mobile devices that support multiple radio access technologies, such as mobile devices that support traditional cellular communications in addition to e.g. Bluetooth and/or WiFi. Reception and transmission conflicts may also be prevalent in such designs, in particular where one radio access technology introduces interferes on another radio access technology or where multiple radio access technologies share transceiver resources.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
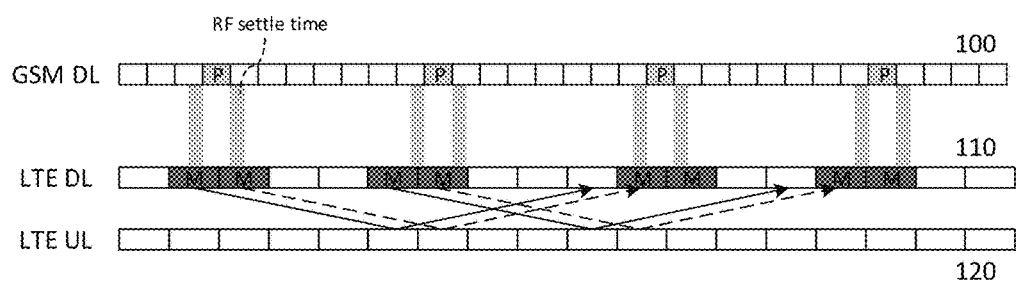
FIG. 1 shows a first timing chart illustrating missed subframes in multi-SIM context.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies.

The term "RAT system" as utilized herein refers to the hardware, software, and/or firmware components of a mobile device that support operation of at least one Radio Access Technology (RAT). A RAT system may thus include one or more microprocessors/microcontrollers and/or one or more processing circuits, where the one or more microprocessors/microcontrollers may be configured to execute program code for software and/or firmware modules to control the microprocessor/microcontrollers to operate in accordance with the protocol stack (Layer 2 and 3) and/or physical layers (Layer 1) of a particular radio access technology. The microprocessors/microcontrollers may be configured to control the one or more processing circuits and any additional components in accordance with control logic provided by the software/firmware modules defined in the program code. It is appreciated that the RAT systems for multiple RATs may be integrated, such as in the case of a multi-mode baseband modem configured to support operation of more than one RAT. Accordingly, one or more microprocessors/microcontrollers, processing circuits, and/or software/firmware modules may be shared between multiple RAT systems. Such may include unified protocol stacks (Layers 2 and 3) and/or unified physical layers (Layer 1). A multi-mode RAT system may thus refer to one or more microprocessors/microcontrollers and one or more processing circuits that cooperatively support multiple RATs, such as in accordance with master and slave RAT roles; however it is appreciated that the term "RAT system" encompasses both single- and multi-mode RAT systems. A RAT system configured for a specific radio access technology may be denoted as e.g. an LTE system, a UMTS system, a GSM system, a Bluetooth system, a WiFi system, etc. A baseband modem may be referred to as a RAT system; however it is appreciated that a multi-mode baseband modem may be composed of multiple RAT systems, e.g. at least one RAT system for each radio access technology supported by the baseband modem, where each RAT system in a multi-mode baseband modem may be discrete or integrated relative to the other RAT systems.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct and indirect transmission. Similarly, the term "receive" encompasses both direct and indirect reception unless explicitly specified.

Multi-SIM designs may need to address timing conflicts caused by the operation of multiple SIMs. For example, both Dual-SIM Dual-Standby (DSDS) and Dual-Receive Dual-Sim Dual-Standby (DR-DSDS) designs may need to share reception and/or transmission resources between two SIMs, such as on a time-sharing basis in which only one SIM can receive and/or transmit at a given point in time. Similarly, multi-SIM designs that allow for one SIM to transmit simultaneously to the other SIM receiving (which may include DSDA, DR-DSDS, and DSDS depending on the specifics of each design) may need to limit transmission resources to avoid receiver desensitization, such as by scheduling lapses in transmission (i.e. "gaps") to reduce reception interference.

Accordingly, multi-SIM designs may minimize timing conflicts between each SIM by scheduling transmission and/or reception operations for each SIM in order to minimize missed or corrupted transmission and reception occasions. However, even careful scheduling may still result in certain missed or corrupted transmission and/or reception occasions for all SIMs. For example, as previously indicated a DSDS design may share a single set of receiver and transmitter resources between two independent SIMs. Accordingly, only one of the SIMs may receive and/or transmit at a time. It may therefore be unlikely for each SIM to be able to complete each scheduled transmission and reception occasion while participating in a transmission/reception time-sharing scheme with the other SIM, in particular when one or both SIMs are in a radio active state.

Similar conflicts may occur between other radio access technologies, such as e.g. between a Cellular Wide Area radio access technology and a Short Range radio access technology (e.g. LTE and WiFi, LTE and Bluetooth, etc.), between two Short Range radio access technologies, etc. For example, a mobile terminal may be configured to support both an LTE radio connection and a WiFi radio connection, where certain LTE bands may interfere with WiFi bands. Alternatively, a mobile terminal may share transceiver resources between multiple such radio access technologies, and may accordingly not be able to concurrently perform radio activity for each radio access technology. Accordingly, there may exist reception and transmission conflicts in numerous mobile device designs.

FIG. 1 shows timing charts 100-120 which illustrate an exemplary scenario in which a first SIM in a DSDS design may miss multiple reception occasions due to reception resource sharing with a second SIM. In the exemplary scenario illustrated in FIG. 1, the first SIM (timing charts 110 and 120) may be a Long Term Evolution (LTE) SIM, which may be e.g. only capable of supporting LTE communications or e.g. may be capable of supporting multiple Radio Access Technologies (RAT) with LTE currently serving as the master RAT. The second SIM may be a Global System for Mobile Communications (GSM) SIM, which may be e.g. only capable of supporting GSM communications or e.g. may be capable of supporting multiple RATs with GSM currently serving as the master RAT. Both the first SIM and the second SIM may be included in a single mobile device (as will be later detailed), and may both be configured to communicate with respective mobile communication networks via a Radio Access Network (RAN) interface of each respective mobile communication network, such as via a wireless radio interface with one or more base stations.

As depicted in FIG. 1, timing chart 100 may correspond to downlink subframes of the second SIM (GSM SIM, e.g. GSM burst periods each of 0.577 ms in duration), while timing charts 110 and 120 may correspond to downlink and uplink subframes, respectively, of the first SIM (LTE SIM, e.g. LTE subframes each of 1 ms in duration). Each depicted time unit of timing chart 100 may thus be a GSM burst period while each depicted tine unit of timing charts 110 and 120 may be an LTE subframe. For simplicity, the description may collectively refer to all such scheduling time periods as a "subframe", which is thus understood as referring to a scheduling time period for any radio access technology. In the following description of the exemplary scenario of FIG. 1, the first SIM may be in a radio active state while the second SIM may be in an idle radio state. However, it is appreciated that alternatively the first SIM and the second SIM may both be in a radio active state or may both be in a radio idle state, as both such scenarios may include time periods in which one or both SIMs may need to receive scheduled downlink data from the network.

The second SIM may need to perform certain downlink reception operations in accordance with the current radio state of the second SIM, e.g. radio idle state in the exemplary scenario of FIG. 1. For example, the second SIM may need to read scheduled paging occasions (e.g. paging bursts in a GSM context), read scheduled system information (e.g. System Information Type messages in a GSM context), and perform radio measurements (e.g. intra-frequency, inter-frequency, and/or inter-RAT depending on the presence of any slave RATs for the second SIM). The second SIM may have some flexibility in performing certain reception operations while having limited or no flexibility in scheduling other reception operations. For example, the network may transmit paging and system information messages only during certain predetermined time periods. Accordingly, the second SIM may need to perform reception during these time periods in order to read paging occasion and system information. In contrast, the second SIM may be able to perform radio measurements on a more flexible basis, as such radio measurements may not need to performed during a specific time period designated by the network (although be somewhat limited as to not conflict with other scheduled reception activity in the case of inter-frequency and inter-RAT measurements). Accordingly, the second SIM may have some flexibility in performing radio measurements while only limited or no flexibility in reading paging occasions and system information.

As shown in FIG. 1, the second SIM may need to periodically read paging occasions (e.g. paging bursts in a GSM context) transmitted by the network (denoted as light gray "P" subframes on timing chart 100). The scheduling for the paging occasions may be determined by the network, such as according to a predefined scheduling period, and accordingly the second SIM may be required to listen to read the paging occasions in order to identify whether further downlink data is scheduled for the second SIM.

Accordingly, in a DSDS design, the second SIM may require access to shared reception resources during the scheduled paging occasions in order to receive and read the paging occasions. As a result, the first SIM may not have access to the shared reception resources during the time periods in which the second SIM is granted access to the reception resources.

Furthermore, the shared reception resources may not be capable of instantaneously switching between reception for the first SIM (e.g. LTE) and reception for the second SIM (e.g. GSM). For example, an RF transceiver component may need to re-calibrate (such as e.g. filter tuning) to perform the switch between reception for the first SIM to reception for the second SIM (and vice versa). As depicted in FIG. 1, there may thus exist an RF settling time which includes a time window in which the shared reception resources switch from reception for the first SIM to reception for the second SIM, and subsequently back to reception for the first SIM.

The first SIM may therefore experience time periods during which reception for the first SIM is suspended. Accordingly, the first SIM may miss certain subframes during the suspended time periods as shown in FIG. 1 (denoted as dark gray "M" subframes on timing chart 110). Downlink data blocks for the first SIM contained in the missed subframes may thus be lost. The term "data block" as used herein may refer to the data contained in a single subframe, e.g. a Transport Block in an LTE context. However this is not considered limiting in nature, and "data block" may additionally include blocks of data that do not exactly correspond to a subframe, such as two subframes of data, a half-subframe of data, etc.

The first SIM may therefore need to receive "retransmissions" of the data contained in each missed subframe. LTE, for example, may utilize a Hybrid Automatic Repeat Request (HARQ) retransmission scheme. In such a HARQ retransmission scheme, an LTE User Equipment (UE) may transmit an Acknowledgement (ACK) or Non-Acknowledgement (NACK) in response to each downlink data block (i.e. one subframe of data; "transport block" in an LTE context) to signal to the network that the data block was successfully or unsuccessfully received, respectively. In accordance with a frequency division duplexing (FDD) context as specified by the 3$^{rd}$ Generation Partnership Project (3GPP), an LTE UE may transmit an ACK/NACK for a data block in the fourth subframe following the scheduled initial downlink subframe of the data block (or e.g. between 4-13 subframes for a time division duplexing (TDD) LTE context). A 4-subframe ACK/NACK delay is depicted in FIG. 1 by the arrows between timing charts 110 and 120.

As the first SIM will lose the data blocks in the missed subframes due to the reception activity of the second SIM, the first SIM may subsequently transmit NACKs (on uplink timing chart 120) to the network during the 4$^{th}$ subframe following each missed data block, thus signaling to the network that a retransmission of the missed data block is required. Accordingly, the network may receive the NACK transmitted by the first SIM and proceed to retransmit the missed data blocks. As will be detailed, the first SIM may additionally miss subframes for reasons not directly related to radio activity of the second SIM, such as due to poor downlink channel quality. The first SIM may similarly transmit NACKs in response to unsuccessful reception of these subframes.

In accordance with an LTE context as specified by 3GPP, downlink HARQ retransmissions may be asynchronous. Accordingly, following transmission of a NACK an LTE UE may not have specific prior knowledge of when the network will perform the retransmission. Accordingly, the network may retransmit the missed subframe anytime within 8-50 subframes (8-50 ms) following the initial missed subframe, e.g. at least 4 ms following transmission of a NACK, where the network may provide an indication control information in a given subframe (e.g. Physical Downlink Control Channel (PDCCH)) specifying that the given subframe contains the retransmitted data block. Each data block and retransmitted data block may contain identification information (or may be included along with control information containing identification information), thus allowing an LTE UE to identify each retransmitted data block.

Returning to the exemplary scenario of FIG. 1, the first SIM may transmit a NACK to the network in the 4$^{th}$ subframe following each missed data block. As depicted by the arrows between timing charts 110 and 120 in FIG. 1, the network may then retransmit the missed data block a certain number of subframes following the NACK (and the initially missed subframe). For example, if the network is experiencing high load conditions, the network may perform the retransmission as soon as possible, e.g. in the 4$^{th}$ subframe following the NACK (i.e. the 8$^{th}$ subframe following the initially missed subframe). However, depending on the reception activity of the second SIM required to receive paging occasions, the first SIM may not be able to receive any data during the retransmission subframe. Accordingly, the first SIM may miss the initial data block in addition to the retransmitted data block. The first SIM may thus need to transmit another NACK and attempt to receive a further retransmission of the data block. It is appreciated that similar situations may occur in which reception activity by the second SIM causes the first SIM to miss multiple transmissions (including retransmissions) of the same data block (as opposed to the initial transmission subframe and an immediately following retransmission subframe as detailed immediately above). Each missed transmission and retransmission may warrant further retransmissions, thus measurably decreasing throughput. It is also appreciated that the first SIM may miss subframes due to other reasons in addition to radio activity by another SIM on shared transceiver resources, such as poor channel quality, Out-of-coverage (OOC) scenarios, etc. Accordingly, such additional missed data blocks may require similar retransmissions, and may align with radio activity by another SIM in order to cause multiple retransmissions of the same data block.

Such timing considerations may additionally apply in the uplink direction. For example, a multi-SIM design may allow for one SIM to transmit concurrently to the other SIM receiving. However, transmission by one SIM concurrent to reception by the other SIM may lead to receiver desensitization, in which transmission for one SIM interferes with the reception for the other SIM. Returning to the exemplary scenario of FIG. 1, the first SIM may be capable of transmitting at the same time that the second SIM is receiving. However, such may introduce interference on reception by the second SIM. Accordingly, transmission for the first SIM may need to be controlled to ensure that interference on reception for the second SIM is minimized, such as by either scheduling transmission gaps for the first SIM during time periods in which the second SIM is scheduled to receive. Accordingly, the first SIM may not be able to transmit simultaneous to reception activity by the second SIM, such as time periods during which the second SIM is scheduled to receive paging occasions as detailed regarding FIG. 1.

Accordingly, the first SIM may not be able to perform any transmission during certain time periods. However, the first SIM may need to transmit ACKs and/or NACKs in response to received transmissions, such as during the $4^{th}$ subframe following each received subframe. The first SIM may therefore not be able to transmit an ACK/NACK during subframes which the second SIM is receiving, which may as a result severely disrupt downlink HARQ procedures and lead to further retransmissions by the network as no feedback was received.

As previously indicated, the second SIM may need to perform radio measurements in addition to the paging occasions and system information reads. Accordingly, such radio measurements by the second SIM may result in further missed data blocks for the first SIM. However, in contrast to the inflexible network scheduling of the paging occasions and system information reads, the second SIM may have some flexibility in performing radio measurements. In order to minimize the cumulative impact of missed data blocks due to both radio measurements and paging occasions/system information reads, the second SIM may carefully select time periods in which to perform the radio measurements. Specifically, the second SIM may select to perform the radio measurements during time periods that are unlikely to contain transmissions or retransmissions of missed data blocks that are missed due to paging occasions, system information reads, other reception activity of the second SIM, or unsuccessful reception by the first SIM.

The second SIM may therefore obtain a retransmission strategy model of the network for the first SIM, and may select to perform radio measurements during subframes of the first SIM that are unlikely to contain retransmissions of data blocks missed by the first SIM. Although the network for the first SIM may perform retransmissions anytime within the 8-50 ms time window (e.g. in an LTE context), the network may exhibit repetitive behavior in performing retransmissions. For example, a base station of the network may be configured according to a specific retransmission strategy (e.g. by an operator), and thus may be more or less likely to perform retransmissions at certain times following reception of a NACK. For example, if a downlink buffer is substantially full, the network may need to perform retransmissions as soon as possible, e.g. 8 subframes (8 ms) following an initial missed subframe, in order to avoid significant downlink delays. Depending on the configuration, the network may regularly favor certain subframes to perform retransmissions.

Accordingly, the second SIM may determine the most likely retransmission time delays (amount of time between an initially transmitted data block and a retransmission of the data block) for the network of the first SIM, such as by observing retransmissions of the first SIM over an observation time period. The second SIM may then develop a probabilistic retransmission strategy model of the network for the first SIM, and may select to perform radio measurements during subframes of the first SIM that are unlikely to contain transmissions or retransmissions of data blocks of the first SIM that are missed, e.g. due to radio activity of the second SIM (e.g. paging occasions, system information reads, radio measurements, etc.) or for other reasons (e.g. poor downlink channel quality for the first SIM)). Such may reduce the likelihood that a data block for the first SIM will require multiple retransmissions while still allowing the second SIM to perform radio measurements. Although retransmissions for the first SIM may be inevitable (due to wireless link imperfections and missed subframes due to paging occasions or system information reads), performance may nevertheless be improved by minimizing the number of multiple retransmissions for the first SIM. As previously indicated, the second SIM may utilize the probabilistic retransmission strategy model when the subframes of the first SIM are missed for reasons other than radio activity of the second SIM using shared reception resources, such as due to poor channel quality or an OOC scenario for the first SIM. Similarly, the second SIM may identify these missed subframes and apply the probabilistic retransmission strategy model in order to avoid missing another transmission of the missed data blocks of the first SIM. It is thus understood that use of the retransmission strategy model is not limited only to scenarios where the first SIM misses data blocks due to radio activity by the second SIM on shared receiver resources, and may instead be applied in any scenario where the first SIM misses a data block.

Such radio activity conflicts may also warrant consideration between e.g. Cellular Wide Area radio access technologies and Short Range radio access technologies, or e.g. different Short Range radio access technologies. For example, Bluetooth RAT system may have an active radio connection concurrent to an active radio connection of an LTE RAT system. As certain LTE bands may interfere with Bluetooth bands (e.g. LTE Band 7 and Band 40 with the Industry, Scientific, and Medical (ISM) band), the LTE RAT system may not be able to transmit uplink signals subsequent to scheduled downlink reception by the Bluetooth RAT system, as such may lead to receiver desensitization at the Bluetooth RAT system. Similar timing conflicts may occur in a wide range of similar co-existence scenarios, where certain radio activity by a first RAT system conflicts with radio activity of a second RAT system, or alternatively where limited transmission and/or reception resources of a mobile terminal prevent the mobile terminal from concurrently performing radio activity for multiple radio connections. Equivalently to as detailed above regarding a first SIM and a second SIM in a multi-SIM design, the second RAT system may estimate the most likely retransmission time delays for the network of the first RAT system by observing retransmission of the first RAT system over an observation time period. The second RAT system may then develop and apply a probabilistic retransmission strategy model of the network of the first RAT system, and may select to perform radio activity during subframes of the first RAT system that are unlikely to contain retransmissions of data blocks of the first RAT system that are missed, e.g. due to radio activity of the second SIM (e.g. paging occasion, system information reads, radio measurements) or for other reasons (e.g. poor downlink channel quality for the first RAT system)). Accordingly, it is appreciated that the following description may be applied to any device that supports multiple radio connections.

Figure 2:
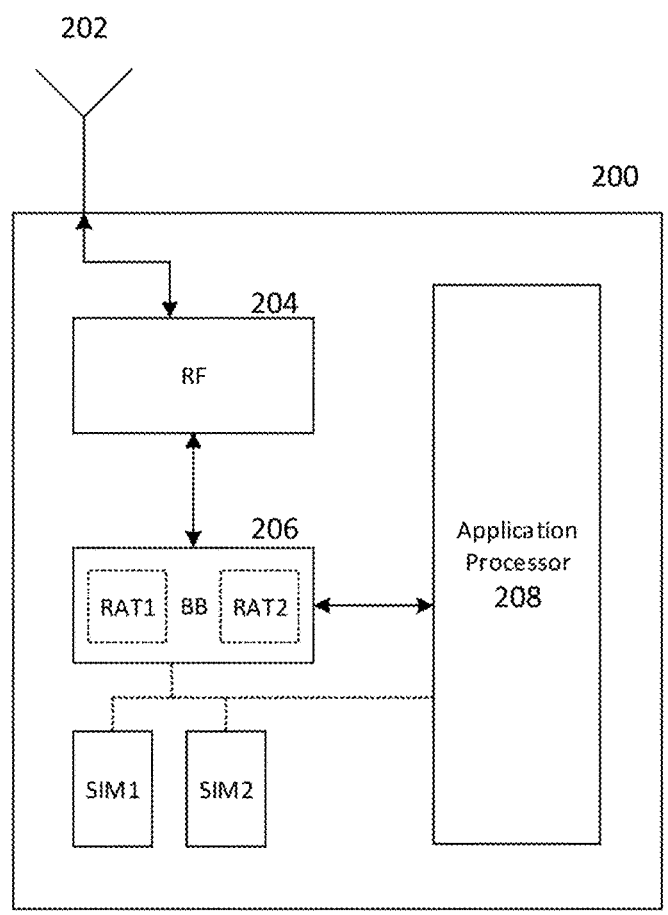
FIG. 2 shows an internal configuration of a mobile terminal device.

FIG. 2 shows a block diagram illustrating an internal configuration of mobile terminal 200 according to an aspect of the disclosure. As will be detailed, mobile terminal 200 may be a device capable of supporting multiple radio connections, such as a multi-SIM device or another mobile device that supports multiple radio access technologies. Mobile terminal device 200 may be configured to schedule certain reception operations for a second radio connection based on the probable transmission and retransmission times of data blocks for a first radio connection. Mobile terminal 200 may attempt to ensure that multiple transmissions (including retransmissions) of the same data block are avoided.

As illustrated in FIG. 2, mobile terminal 200 may include antenna 202, radio frequency (RF) transceiver 204, baseband system 206, application processor 208, SIM1, and SIM2. As shown in in FIG. 2, the aforementioned components of mobile terminal 200 may be implemented as separate components. However, it is appreciated that the architecture of mobile terminal 200 depicted in FIG. 2 is for purposes of explanation, and accordingly one or more of the aforementioned components (or additional components not explicitly shown in FIG. 2) of mobile terminal 200 may be integrated into a single equivalent component or divided into two separate components with collective equivalence. It is understood that mobile terminal 200 may have one or more additional components, such as additional hardware, software, or firmware elements. For example, mobile terminal 200 may further include various additional components including processors/microprocessors, controllers/microcontrollers, memory, other specialty or generic hardware/processors/circuits, etc., in order to support a variety of additional operations. Mobile terminal 200 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of mobile terminal 200, in particular, RF transceiver 204, baseband system 206, and application processor 208 may be implemented in a number of different manners, such as by hardware, firmware, software executed on hardware (e.g. a processor), or any combination thereof. Various options include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in an aspect of the disclosure mobile terminal 200 may include a radio processing circuit (RF transceiver 204) configured to receive and process radio frequency signals, and one or more baseband modems (baseband system 206) configured to monitor retransmissions from a mobile communication network for a first radio connection during an observation time period, determine a probabilistic model that characterizes a retransmission strategy of the mobile communication network based on the monitored retransmissions, and schedule radio operations of a second radio connection based on the probabilistic model. In another aspect of the disclosure, mobile terminal 200 may be a mobile terminal device having a first radio connection and a second radio connection, the mobile terminal device including a radio processing circuit (RF transceiver 204) configured to receive and process radio frequency signals, and one or more baseband modems (baseband system 206) configured to identify a missed subframe of the first radio connection, select a subframe from one or more additional subframes of the first radio connection during which to schedule radio activity of the second radio connection based on a probability metric for each of the one or more additional subframes, where the probability metric for each given subframe of the one or more additional subframes indicates a probability that the subframe contains a data block of the missed subframe, and perform the scheduled radio activity of the second radio connection during the selected subframe of the first radio connection.

In an abridged overview of the operation of mobile terminal 200, mobile terminal 200 may be configured to receive and/or transmit wireless signals according to multiple different wireless access protocols or radio access technologies (RATs), including any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The specific RAT capabilities of mobile terminal 200 may be dependent on the RAT capabilities of SIM1 (e.g. as a first radio connection of mobile terminal 200), SIM2 (e.g. as a second radio connection of mobile terminal 200), and baseband system 206.

Further to the abridged overview of operation of mobile terminal 200, RF transceiver 204 may receive radio frequency wireless signals via antenna 202, which may be implemented as e.g. a single antenna or an antenna array composed of multiple antennas. RF transceiver 204 may include various reception circuitry elements, which may include e.g. analog circuitry, configured to process externally received signals, such as mixing circuity to convert externally received RF signals to baseband and/or intermediate frequencies. RF transceiver 204 may also include amplification circuitry to amplify externally received signals, such as power amplifiers (PAs) and/or Low Noise Amplifiers (LNAs), although it is appreciated that such components may also be implemented separately. RF transceiver 204 may additionally include various transmission circuitry elements configured to transmit internally received signals, such as e.g. baseband and/or intermediate frequency signals provided by baseband system 206, which may include mixing circuitry to modulate internally received signals onto one or more radio frequency carrier waves and/or amplification circuitry to amplify internally received signals before transmission. RF transceiver 204 may provide such signals to antenna 202 for wireless transmission. RF transceiver 204 may be structurally configured according to various different transceiver architectures dependent on the intended capabilities of mobile terminal 200. For example, RF transceiver 204 may include a single receiver subsystem and single transmitter subsystem, e.g. for a DSDS multi-SIM design. Alternatively, RF transceiver 204 may include two receiver subsystems and a single transmitter subsystem, e.g. for a DR-DSDS multi-SIM design. Alternatively, RF transceiver 204 may include two receiver subsystems and two transmitter subsystems, e.g. for a DSDS multi-SIM design.

Further references herein to reception and/or transmission of wireless signals by mobile terminal 200 may thus be understood as an interaction between antenna 202, RF transceiver 204, and baseband system 206 as detailed above. Although not explicitly depicted in FIG. 2, RF transceiver 204 may be additionally be connected to application processor 208.

Figure 3:
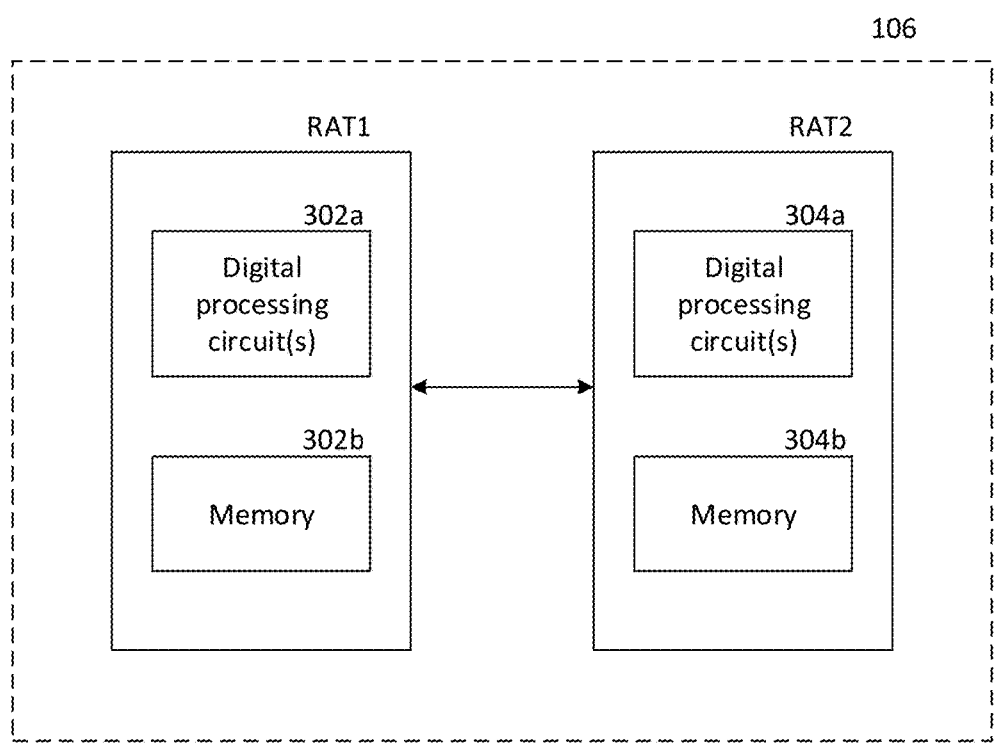
FIG. 3 shows an internal configuration of a baseband system of a mobile terminal device.

FIG. 3 shows a block diagram illustrating an internal configuration of baseband system 206 according to an aspect of the disclosure. Baseband system 206 may include RAT system RAT1 and RAT system RAT2, which may each be configured to support at least one radio connection each, where each radio connection may be for the same or different radio access technologies. In a multi-SIM context, RAT1 and RAT may be respectively allocated to SIM1 and SIM2 in accordance with a multi-SIM design. RAT1 may include digital processing circuit(s) 302a (one or more digital processing circuits) and memory 302b while RAT2 may include digital processing circuit(s) 304a and memory 304b. Digital processing circuit(s) 302a and 304a may each include at least one microprocessor/microcontroller configured to execute program code for software and/or firmware modules to control the at least one processor/controller to operate in accordance with protocol stack (Layer 2 and 3) and physical (Layer 1) layers of one or more radio access technologies. Each respective microprocessor/microcontroller of digital processing circuit(s) 302a and 304a may retrieve the corresponding code from memory 302b and 304b, respectively, and subsequently execute the program code. The respective microprocessors/microcontrollers of digital processing circuit(s) 302a and 304a may additionally control one or more additional processing circuits of digital processing circuit(s) 302a and 304a in accordance with control logic provided by the software/firmware modules defined in the program code. Further references to actions by RAT systems RAT1 and RAT2 may thus refer to operation of digital processing circuit(s) 302a and 304a in response to execution of program code stored in memory 304a and 304b, respectively.

Furthermore, RAT systems RAT1 and RAT2 of baseband system 206 may accordingly directly and/or indirectly control operations of RF transceiver 204, such as to perform specific transmission and/or reception activities as detailed above. RAT systems RAT1 and RAT2 of baseband system 206 may additionally control various other audio/video components (e.g. audio transducers including microphone(s) and/or speaker(s)) of mobile terminal 200.

The supported radio access technologies of RAT1 and RAT2 may depend on the RAT capabilities of SIM1 and SIM2. RAT systems RAT1 and RAT2 may each be multi-mode RAT systems, and accordingly may each be configured to operate in accordance with more than one radio access technology, e.g. two or more of LTE, UMTS, GSM, Bluetooth, WiFi, etc. RAT1 and RAT2 may each be configured to operate in accordance with master RAT and slave RAT roles, e.g. in accordance with a given RAT in a primary role (master RAT) while any remaining RATs assume a secondary role (slave RAT).

Baseband system 206 may be composed of one or more baseband modems, which may correspond to one or both of RAT1 and RAT2. For example, RAT system RAT1 may be implemented as a single baseband modem while RAT system RAT2 may be implemented as a separate baseband modem. Alternatively, RAT systems RAT1 and RAT2 may be implemented as a single unified baseband modem, e.g. a baseband modem configured to two separate network connections for SIM1 and SIM2 in accordance with a multi-SIM design (e.g. DSDS, DR-DSDS, DSDA, etc.).

RAT1 and RAT2 may be configured to exchange data over at least one interface, which may be unidirectional or bi-directional. The interface may be a data bus, shared memory, or another interface allowing exchange of data. As will be detailed, RAT1 and RAT2 may be configured to exchange information regarding downlink data blocks in order to coordinate scheduling.

Application processor 208 may be implemented as a Central Processing Unit (CPU). Application processor 208 may be configured to execute various applications and/or programs of mobile terminal 200, such as e.g. applications corresponding to program code stored in a memory component of mobile terminal 200 (not explicitly shown in FIG. 2). Application processor 208 may also be configured to control one or more further components of mobile terminal 200, such as user input/output devices (display(s), keypad(s), touchscreen(s), speaker(s), external button(s), camera(s), microphone(s), etc.), peripheral devices, memory, power supply, external device interfaces, etc.

Although baseband system 206 and application processor 208 are depicted separately in FIG. 2, it is appreciated that this illustration is not limiting in nature. Accordingly, it is understood that baseband system 206 and application processor 208 may be implemented separately, implemented together (i.e. as an integrated unit), or partially implemented together.

Mobile terminal 200 may be structurally configured according to a multi-SIM design, such as DSDS, DR-DSDS, DSDA, etc. While the following exemplary descriptions may specifically refer to a specific multi-SIM design, it is appreciated that such is not considered limiting in nature.

Similarly to as detailed regarding FIG. 1, mobile terminal 200 may be configured according to a DSDS design. Accordingly, baseband system 206 may be configured to allow RAT systems RAT1 and RAT2 to access reception and transmission resources of RF transceiver 204 on a time-sharing basis, e.g. for a first radio connection of RAT1 and a second radio connection of RAT2. As a result, only one of RAT1 and RAT2 may receive at a given point in time. RAT1 and RAT2 may be configured to control RF transceiver 204 to switch between reception for RAT1 and reception for RAT2 depending on the specifics of the reception resource sharing scheme. Baseband system 206 may thus include an arbitration layer or other component configured to interact with RAT1 and RAT2 in order to execute sharing of RF transceiver 204.

Figure 4:
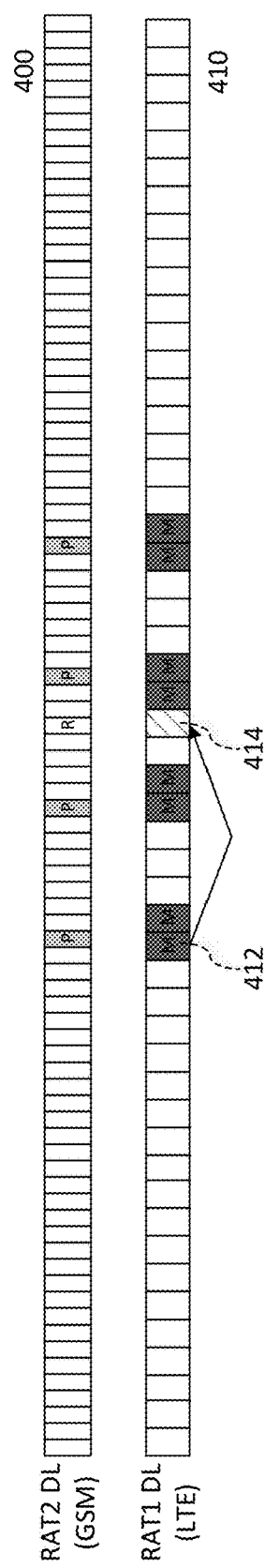
FIG. 4 shows a second timing chart illustrating missed subframes in multi-SIM context.

FIG. 4 shows timing charts 400 and 410 which illustrate an exemplary scenario similar to FIG. 1 in which a time-sharing reception scheme in a mobile terminal device configured to support multiple separate radio connections may cause one radio connection to miss data blocks during certain missed subframes due to conflicting radio activity by the other radio connection.

While the following description may refer to a mobile terminal device supporting multiple radio connections for SIMs of Cellular Wide Area radio access technologies, the implementations detailed herein may be analogously applied to supporting multiple radio connections for any of Short Range radio access technologies, Cellular Wide Area radio access technologies, or Metropolitan Area System radio communication technologies.

As previously indicated, DSDS designs may cause a SIM to miss data blocks during certain missed subframes due to conflicting radio activity by the another SIM. RAT1 may an LTE system (or a multi-RAT system with LTE currently serving as the master RAT) currently in a radio active state while RAT2 may be a GSM system (or a multi-RAT system with GSM currently serving as the master RAT) currently in a radio idle state. Accordingly, RAT1 may be actively coupled to an LTE cell via a radio interface of an LTE network while RAT2 may be camped on a GSM cell via a radio interface of a GSM network. It is understood that this scenario is exemplary, and accordingly that RAT1 and RAT2 may support different radio access technologies and/or be in a different radio connectivity state.

RAT2 may need to perform radio activity such as scheduled paging reads, system information reads, and radio measurements in accordance with a radio idle state. Certain radio activity, including paging and system information occasions, may be preconfigured by the GSM network, where RAT2 may receive control signaling from GSM network that indicates the particular scheduling of the paging and system information occasions. RAT2 may need to perform radio measurements in addition to the paging occasion and system information reads, which may include intra-frequency measurements, inter-frequency measurements, and inter-RAT measurements (depending on the RAT capabilities of RAT2 and SIM2). While the timing of such radio measurements may be constrained to a certain degree (e.g. in accordance with a Discontinuous Reception (DRX) cycle and to avoid conflict with scheduled paging and system information reads), RAT2 may have some flexibility in performing the radio measurements. RAT2 may thus be able to select time periods to perform the radio measurements without having to adhere to a rigid network-defined schedule.

As previously indicated, RAT1 may be in a radio active state, and accordingly may need to perform downlink reception and uplink transmission in accordance with a largely inflexible scheduling configuration provided by the LTE network, e.g. as control signaling. Accordingly, RAT1 may have little to no flexibility in scheduling adjustments.

RAT1 may additionally execute a retransmission scheme according to a Hybrid Automatic Repeat Request (HARQ) configuration, of which downlink HARQ is of particular interest relative to this disclosure. As previously detailed regarding FIG. 1, an RAT1 may transmit an ACK or NACK in response to each scheduled downlink data block (e.g. a transport block, corresponding to a single subframe) in a downlink LTE HARQ scheme according to the 3GPP. RAT1 may transmit the ACK or NACK for a given data block in the $4^{th}$ subframe (i.e. 4 ms) following scheduled reception of the data block. The LTE network (e.g. a base station/evolved Node B (eNodeB) of the LTE network acting as the serving base station for the LTE UE) may receive the ACK/NACK and proceed to either retransmit the same data block (in the event of a NACK) or proceed to transmit the next data block (in the event of an ACK). The downlink HARQ scheme may be asynchronous, and accordingly the LTE network may retransmit the data block anytime between 8-50 ms following the initial transmission of the data block. The LTE network may provide an indication of the presence of a retransmitted data block in a given subframe by including control information in the subframe (e.g. in the Physical Downlink Control Channel (PDCCH) of a given subframe) that identifies the retransmitted data block.

RAT1 may then transmit another ACK/NACK in response to reception of a received data block, to which the LTE network may perform another retransmission (NACK) or proceed to transmit a new data block (ACK). Certain HARQ configurations may additionally use combining schemes in which RAT1 may combine multiple transmissions (e.g. an initial transmission plus one or more retransmissions) of a given data block in order to aggregate multiple versions of the same data block into a single aggregated data block with potentially reduced error. RAT1 may transmit an ACK in the event that multiple versions of a given data block combine to satisfy the conditions of a successful reception.

RAT1 may utilize error checks, such as a cyclic redundancy check (CRC), in order to determine if each data block is successfully or unsuccessfully received. RAT1 may thus transmit a NACK in the event that a received data block does not satisfy the error checking mechanisms. RAT1 may additionally transmit a NACK in the event that a data block was not received at all.

As shown in FIG. 4, SIM2 (RAT2) may need to read scheduled paging occasions (denoted as light gray "P" subframes on timing chart 400) according to a paging cycle configured by the GSM network, and accordingly RF transceiver 204 may need to be configured to receive data for RAT2 during the scheduled paging occasions. RAT1 may thus not be able to receive any data during the time periods in which RF transceiver 204 is receiving for RAT2, thus resulting in missed subframes (denoted as dark gray "M" subframes on timing chart 410). There may also exist an RF settling time (not shown in FIG. 4) that encompasses the time required to switch RF transceiver 204 from receiving for RAT1 to receiving for RAT2 (and vice versa) which may also contribute to the missed subframes. Although FIG. 4 specifically depicts paging occasions by RAT2, it is understood that system information reads may result in substantially analogous scenarios.

RAT1 may thus inevitably miss certain data blocks as a result of the time-sharing of RF transceiver 204 between RAT1 and RAT2. Although not shown in FIG. 4, RAT1 may additionally miss further data blocks for other reasons, such as poor channel quality (i.e. unsuccessfully received data blocks, which may be detected via e.g. CRC) or OOC scenarios. Accordingly, RAT1 may need to transmit NACKs in response to each missed data block. As no data will be received during the missed subframes due to RAT2 radio activity, RAT1 may not be able to obtain any data to HARQ combining from the missed subframes. RAT1 may therefore need to receive further downlink subframes in order to receive the retransmitted data block, which the LTE network may transmit asynchronously as previously detailed.

In addition to paging occasion and system information reads, RAT2 may need to perform radio measurements, which may be utilized as part of mobility procedures including cell (re)selection, measurement reporting, and/or handovers depending on the radio state of RAT2. In contrast to the limited or no flexibility available to RAT2 in scheduling these reception operations, RAT2 may be able to freely schedule radio measurements without rigid adherence to a network-specified schedule. Accordingly, radio measurements may be considered "free" operations while paging occasion and system information reads may be considered "locked" operations. It is appreciated that further "free" and "locked" operations may additionally be considered, where free operations are characterized by substantial flexibility in scheduling by a UE in contrast to limited or non-existent scheduling for locked radio operations (e.g. due to network-specified scheduling). Such free and locked operations may additionally be present in a wide range of radio access technologies other than the LTE and GSM context explicitly detailed here. Furthermore, the implementation detailed herein may be applied without explicit designation of free and locked operations, and may accordingly be performed only with "free" operations (e.g. where substantially all radio activity is flexible a retransmission strategy model is applied to schedule such flexible operations).

Accordingly, RAT2 may need to perform both free and locked radio operations. Due to the time-sharing scheme between RAT1 and RAT2, free operations by RAT2 may cause RAT1 to miss further subframes, thus resulting in further lost data blocks for each missed subframe.

For example, RAT1 may miss subframe 412 due to a locked radio operation of RAT2, and may subsequently transmit a NACK to the LTE network indicating unsuccessful receipt of subframe 412. The LTE network may then perform a retransmission of the data block in subframe 412, which may occur e.g. 8 ms (8 subframes) after the subframe 412 at subframe 414. Accordingly, if RAT2 schedules a free operation (such as a radio measurement) during subframe 414, RAT1 may additionally miss the retransmission of the data block during subframe 414, and may thus require a further retransmission. Similar situations may additionally conflict with later retransmissions of the same data block, thus potentially resulting in e.g. 3, 4, 5, etc., retransmissions. Additionally, neither of subframes 412 or 414 may provide any data useful for HARQ combining by RAT1 as no data was received. Such multiple transmissions may appreciably reduce data throughput, thus potentially degrading user experience.

Alternatively, RAT1 may miss subframe 412 due to poor channel quality at RAT1, i.e. may receive data during subframe 412 that is too corrupted to utilize, or may experience an OOC scenario in which RAT1 can not receive any downlink data. Similarly, RAT1 may transmit a NACK to the LTE network indicating unsuccessful receipt of subframe 412. The LTE network may then perform a retransmission of the data block in subframe 412, which may similarly occur e.g. 8 ms (8 subframes) after the subframe 412 at subframe 414. Accordingly, if RAT2 schedules a free operation (such as a radio measurement) during subframe 414, RAT1 may additionally miss the retransmission of the data block during subframe 414, and may thus require a further retransmission. Similar situations may additionally conflict with later retransmissions of the same data block, thus potentially resulting in e.g. 3, 4, 5, etc., retransmissions. In contrast to above, RAT1 may be able to utilize some of the data block of subframe 412 in HARQ combing. However, RAT1 may not be able to utilize any data from subframe 414 for HARQ combining, as no data will be received for RAT1.

Accordingly, as will be detailed mobile terminal 200 may attempt to avoid multiple retransmissions for individual data blocks by selectively scheduling free operations by RAT2 relative to locked radio operations of RAT2 and other missed subframes of RAT1 in order to minimize the probability that the particular scheduling of the free and locked radio operations will cause RAT1 to require multiple retransmissions of the same data block. It is appreciated that RAT1 and RAT2 may be considered arbitrary and are not limited to any specific RAT or radio state.

Figure 5:
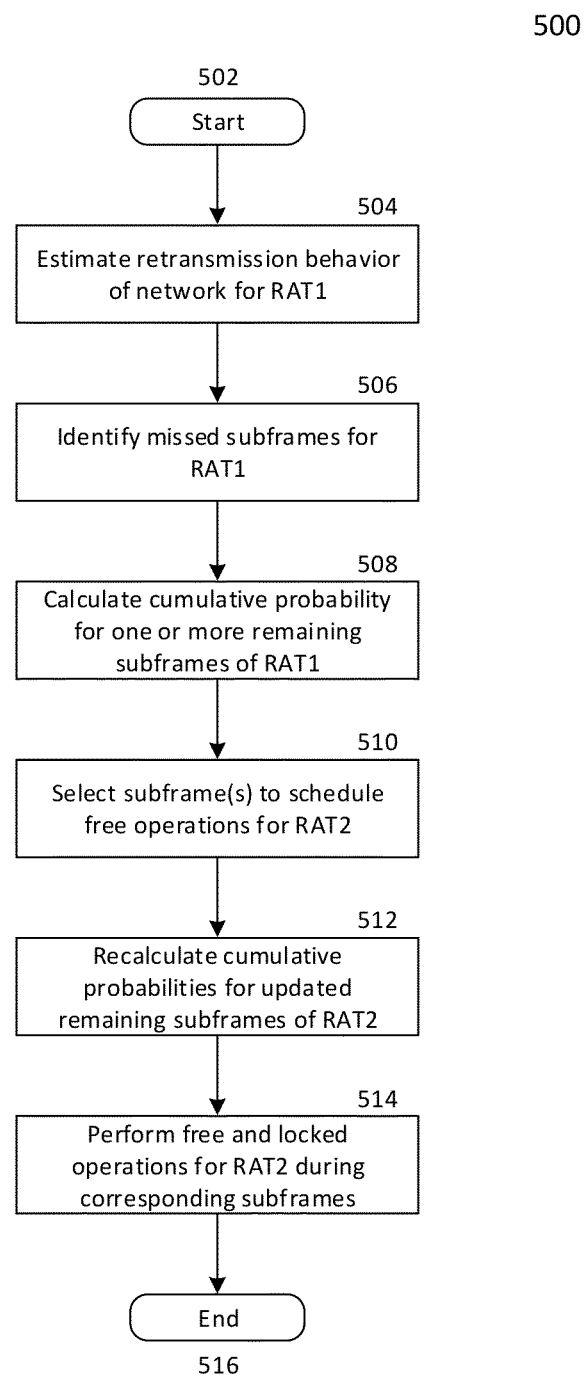
FIG. 5 shows a flow chart illustrating a method for scheduling radio activity for a first SIM and second SIM based on a probabilistic retransmission strategy model.

FIG. 5 shows a flow chart illustrating method 500 for scheduling reception and/or transmission operations in a multi-SIM design. Baseband system 206 may perform method 500 in order to reduce the number of retransmissions required by one or both RAT interfaces RAT1 and RAT2. Method 500 may involve interaction between RAT1 and RAT2.

Method 502 may initiate in 502. In 504, baseband system 206 may estimate the retransmission behavior of the network for SIM1, e.g. the retransmission behavior of the LTE network. As previously indicated, retransmission behavior may be predictable, and accordingly it may be possible to estimate the retransmission strategy of a network via probabilistic modeling. Accordingly, baseband system 206 may estimate the retransmission strategy of the network for RAT1 and selectively schedule operations of RAT2 to avoid causing multiple retransmissions for missed data blocks of RAT1.

In order to estimate the retransmission behavior of the LTE network, RAT1 may monitor each retransmission over an observation period, which may be e.g. in the order of seconds, e.g. 1 s, 2 s, 0.5 s, etc. Due to inherent wireless link imperfections, retransmissions may be necessary in substantially all wireless data transfers. RAT1 may thus identify each retransmitted data block during the observation period. As each data block may contain (or have accompanying control information containing) identification information uniquely identifying the data block, RAT1 may "match" each retransmitted data blocks to the corresponding initially transmitted data block. RAT1 may then calculate the retransmission delay for each retransmission, where the retransmission delay is the amount of time between the initial transmission and the retransmission. In accordance with an LTE context as specified by 3GPP, the possible retransmission delays consist of the set [8, 9, 10, . . . , 49, 50 ms], i.e. any given retransmission may occur between 8-50 ms following the initial transmission. RAT1 may count the number of occurrences for each possible retransmission delay, e.g. by sorting each observed retransmission into the corresponding "bin" where each bin is retransmission delay of one of [8, 9, 10, . . . , 49, 50 ms].

It is appreciated that while the probabilistic retransmission strategy model calculation of 504 is detailed regarding an LTE network, similar procedures may be analogously applied to networks of various other radio access technologies, which may have retransmission strategies that are more or less deterministic than the asynchronous HARQ procedure of LTE.

Table 1 shows retransmission delay results from an exemplary scenario in which RAT1 observes retransmissions over a 0.5 second observation period.

TABLE 1

| Time delay (ms) | # of Occurrences | Probability |
|---|---|---|
| 8 | 25 | 0.52 |
| 9 | 0 | 0 |
| 10 | 2 | 0.04 |
| 11 | 0 | 0 |
| 12 | 0 | 0 |
| 13 | 0 | 0 |
| 14 | 7 | 0.15 |
| 15 | 0 | 0 |
| 16 | 14 | 0.29 |
| 17 | 0 | 0 |
| . . . | 0 | 0 |
| 49 | 0 | 0 |
| 50 | 0 | 0 |

As shown in Table 1, RAT1 may observe each retransmission, e.g. by receiving and processing each retransmitted data block, and compare each retransmission to the corresponding initial transmission in order to calculate the retransmission delay for each observed retransmission. In the exemplary scenario of Table 1, RAT1 may observe 25 retransmissions with an 8 ms retransmission delay (e.g. the retransmitted data block was received 8 ms following the initial transmission of the data block), 2 retransmissions with a 10 ms retransmission delay, 7 retransmissions with a 14 ms retransmission delay, and 14 retransmissions with a 16 ms retransmission delay. RAT1 may not observe any retransmissions with the remaining possible retransmission delays, i.e. 9, 11, 12, 13, 15, 17, 18, . . . , 49, and 50 ms.

RAT1 may count each retransmission individually, e.g. without considering multiple retransmissions, and accordingly may count each multiple retransmission as multiple separate retransmissions each occurring with a retransmission delay relative to the initial transmission (i.e. as opposed to a previous retransmission).

Accordingly, RAT1 may determine the retransmission delay distribution over the observation period in 504. The retransmission delay distribution may characterize the retransmission strategy of the LTE network. For example, the LTE network may heavily favor retransmissions with an 8 ms retransmission delay, as such retransmissions accounted for over 50% of all observed retransmissions during the observation period. The LTE network may additionally favor retransmissions with a 16 ms retransmission delay and 14 ms retransmission delay, while only minimally favoring 10 ms retransmission delays.

Accordingly, RAT1 may utilize the retransmission delay distribution observed during the observation period as a probabilistic retransmission strategy model of the LTE network. For example, RAT1 may interpret the retransmission delay distribution as indicating that each retransmission has a 52% probability of occurring 8 ms following the initial transmission, 29% probability of occurring 16 ms following the initial transmission, 15% probability of occurring 14 ms following the initial transmission, and 4% probability of occurring 10 ms following the initial transmission. RAT1 may calculate each probability based on the observed retransmissions as:

$$\frac{\text{occurrences of a retransmission time delay}}{\text{total retransmissions}}$$

As will be later detailed, RAT1 may utilize alternative calculations to determine the probabilities, such as by using weighting.

The resulting retransmission delay probabilities (one for each possible retransmission delay) may thus constitute a probabilistic retransmission strategy model for the LTE network. RAT1 may then provide the retransmission strategy model to RAT2, which RAT2 may employ in 506-514 in order to selectively schedule free reception operations in order to reduce multiple retransmissions for RAT1.

It is appreciated that baseband system 206 may implement numerous procedures in order to exchange data including the retransmission strategy model between RAT1 and RAT2. For example RAT1 may perform a table write to memory 304b of RAT2. Alternatively, RAT1 may perform a table write to a shared memory between RAT1 and RAT2 (not shown in FIG. 3). Alternatively, RAT1 may utilize an interface (bidirectional or unidirectional from RAT1 to RAT2) to exchange data with RAT2 in order to provide the retransmission strategy model to RAT2. Furthermore, it is appreciated that alternatively RAT1 may provide RAT2 with raw data, such as by providing RAT2 with the number of occurrences for each retransmission time delay. Alternatively, RAT1 may only provide RAT2 with the data block identifiers for each received data block (included retransmissions) over the observation period. In such cases, RAT2 may be configured to perform the requisite calculations to derive the retransmission strategy model for the LTE network. Many such variations are thus recognized.

Similarly, RAT1 may need to provide indication to RAT2 that RAT1 has missed a subframe due to reasons other than RAT2 radio activity, such as poor channel quality or OOC scenarios. As RAT1 may need to attempt reception in both cases during the subframe before determining that the subframe was missed, RAT1 may provide RAT2 with an indication of a missed subframe following the conclusion of the subframe (and e.g. determining that the received data block is corrupted).

Accordingly, RAT2 may obtain the retransmission strategy model for the LTE network of RAT1 at 504. RAT2 may then seek to minimize the occurrence of multiple retransmissions for RAT1. As previously indicated, RAT1 may inevitably miss certain subframes due to locked radio operations of RAT2. Such RAT1 subframes may be referred to as missed locked subframes, which may each contain at least one missed locked data block. RAT1 may additionally miss subframes due to other reasons not related to RAT2 radio activity, which may be referred to as missed other subframes. RAT1 may also miss further subframes due to free operations of RAT2, i.e. missed free subframes and missed free data blocks. RAT2 may selectively choose the time periods during which to perform free operations in order to minimize the probability that a missed locked subframe of RAT1 or missed other subframe of RAT1 and a missed free subframe of RAT1 contain the same data block, which would require at least two retransmissions of the missed data block.

RAT2 may thus identify the missed subframes of RAT1 in 506, which may include both missed locked subframes of RAT1, i.e. the subframes of RAT1 that conflict with locked radio operations of RAT2 (e.g. the missed subframes of timing chart 410) and missed other subframes of RAT1. As RAT2 has prior knowledge of the scheduling for locked radio operations (e.g. paging occasion and/or system information reads), RAT2 may identify the subframes of RAT1 that conflict with the locked radio operations as the missed subframes of RAT1. RAT1 may need to provide RAT2 with an indication that other subframes were missed for reasons unrelated to RAT2.

Upon identifying the missed locked subframes and missed other subframes of RAT1 in 506, RAT2 may use the probabilistic retransmission strategy model for RAT1 in order to estimate when transmissions or retransmissions of missed data blocks of RAT1 are likely to occur. RAT2 may then select to perform free operations during time periods that are unlikely to contain a transmission or retransmission of a missed data block of RAT1. RAT2 may therefore identify the remaining subframes of RAT1, i.e. the subframes of RAT1 that are not missed subframes of RAT1 (missed locked subframes or missed other subframes). RAT2 may then apply the probabilistic retransmission strategy model for RAT1 to calculate a cumulative probability for each remaining subframe of RAT1, where the cumulative probability for each remaining subframe of RAT1 represents the probability that each remaining subframe will contain a transmission or retransmission of a missed data block of RAT1.

Figure 6:
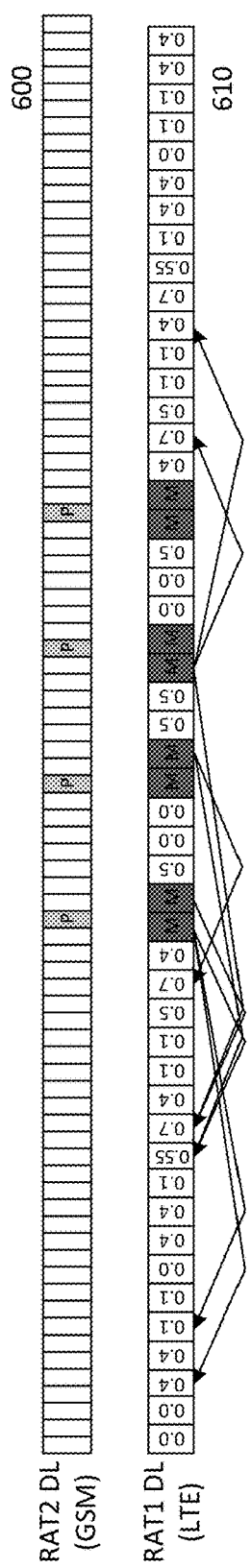
FIG. 6 shows a third timing chart illustrating missed subframes in multi-SIM context.

FIG. 6 shows timing charts 600 and 610 illustrating such a probability calculation for 506, which additionally utilizes the exemplary retransmission delay distribution provided in Table 1. In order to calculate the cumulative probability for each remaining subframe of RAT1, RAT2 may add the retransmission delay probabilities for each missed locked subframe and each missed other subframe. For example, the probabilistic retransmission strategy model for RAT1 may indicate a 52% probability that a retransmission will occur 8 ms following an initial transmission. Accordingly, the $8^{th}$ subframe following each missed locked subframe and missed other subframe of RAT1 may contain a retransmission of the missed locked data block that was originally missed during the missed locked subframe.

Similarly, the $8^{th}$ subframe preceding each missed locked subframe of RAT1 may contain an initial transmission (or previous retransmission) of a data block that will be missed during the missed locked subframe. As RAT2 may have knowledge of the scheduling for locked operations far in advance, RAT2 may be able to determine whether subframes preceding missed locked subframes of RAT1 are likely to contain a missed locked data block. However, as RAT1 may not be aware of missed other subframes (i.e. due to poor downlink channel quality or OOC scenarios) until the missed subframe of RAT1 is over, RAT2 may only be able to apply the retransmission strategy model in a "forward" manner for missed other subframes of RAT1, i.e. looking forward in time following the missed other subframe to identify when a corresponding data block for the missed other subframe may be retransmitted.

Accordingly, both the $8^{th}$ preceding and $8^{th}$ succeeding subframes of each missed locked subframe may have a 52% probability of containing a data block from the missed locked subframe. Similarly, the $16^{th}$ preceding and $16^{th}$ succeeding subframes of each missed locked subframe may have a 29% probability of containing a data block from the missed locked subframe, and so forth for the remaining possible retransmission delays represented in the probabilistic retransmission strategy model. Such is depicted by the arrows in FIG. 6 (not all mappings are explicitly shown by the arrows in FIG. 6).

RAT2 may therefore aggregate the probabilities for each locked missed subframe and each missed other subframe of RAT1 to calculate a cumulative probability for each remaining subframe in 508, where each cumulative probability indicates the likelihood (based on the probabilistic retransmission strategy model) that each remaining subframe contains a missed data block (i.e. a data block contained in a missed locked subframe as either an initial transmission or retransmission or a data block contained in a missed other subframe as either an initial transmission or retransmission). Timing chart 610 includes the resulting cumulative probabilities for each remaining subframe of RAT1 (although not all arrow mappings are depicted in FIG. 6 for simplicity). RAT2 may apply arithmetic logic to determine the cumulative probability for each remaining subframe, such as by using a summing operation to iteratively sum the probabilities associated with each missed subframe of RAT1 (i.e. the possible retransmission delays for each missed locked subframe and the possible retransmission delays for each missed other subframe)). Such may result in a vector or sequence of values, where each element contains the cumulative probability for a given remaining subframe. Although FIG. 6 only shows locked missed locked subframes of RAT1, RAT1 may additionally miss other subframes. As previously indicated, RAT2 may only be able to apply the probabilistic retransmission strategy model in a "forward" manner, i.e. forward in time following detection of a missed other subframe of RAT2. Accordingly, RAT2 may consider the probabilistic retransmission strategy model for the remaining subframes occurring after a missed other subframe of RAT1 in calculating the cumulative probabilities for these remaining subframes. RAT2 may therefore add the probabilities associated with both locked missed subframes and missed other subframes of RAT1 in order to calculate the cumulative probability for each remaining subframe, where the cumulative probability for each remaining subframe accounts for the probability of containing a data block for a missed locked subframe or a missed other subframe of RAT1.

After calculating the cumulative probabilities for each remaining subframe in 508, RAT2 may select subframes of RAT2 to schedule free operations in 510. As RAT1 will miss each missed locked subframes and potentially missed other subframes (not explicitly shown in FIG. 6), RAT2 may schedule the free operations in order to minimize the probability that a free operation of RAT2 will cause RAT1 to miss another transmission or retransmission of a missed data block (i.e. a data block contained in a missed locked subframe or a missed other subframe).

As shown in timing chart 610 of FIG. 6, certain remaining subframes of RAT1 may have different cumulative probabilities than other remaining subframes of RAT1. Accordingly, remaining subframes with lower cumulative probabilities may indicate a reduced likelihood that the remaining subframe contains a missed data block.

In order to reduce the number of multiple retransmissions for RAT1, RAT2 may select remaining subframes of RAT1 with low cumulative probabilities as subframes to perform free operations. Accordingly, RAT2 may evaluate each subframe of RAT2 based on the conflicting remaining subframes of RAT1 and the cumulative probabilities of each conflicting remaining subframe of RAT1.

Figure 7:
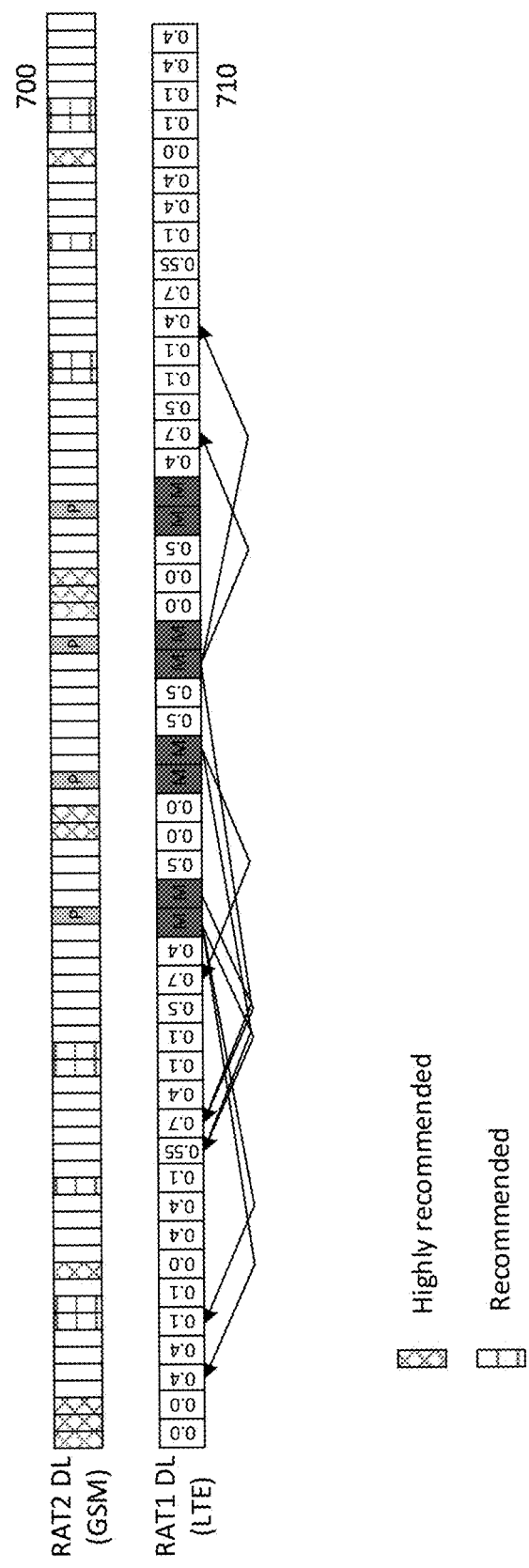
FIG. 7 shows a fourth timing chart illustrating missed subframes in multi-SIM context.

For example, RAT2 may select subframes of RAT2 that conflict with remaining subframes of RAT1 having the lowest cumulative probability as subframes of RAT2 to perform free operations. Such an example is shown in timing chart 700 of FIG. 7, in which subframes of RAT2 that conflict with remaining subframes of RAT1 having the lowest cumulative probability (e.g. 0.0 based on the probabilistic retransmission strategy model) are denoted as "Highly recommended" while subframes of RAT2 that conflict with remaining subframes of RAT1 having relatively low cumulative probability (e.g. 0.1 based on the probabilistic retransmission strategy model) are denoted as "Recommended". RAT2 may then select subframes of RAT2 to perform free operations, such as by selecting one or more highly recommended subframes of RAT2 (and/or one or more recommended subframes of RAT2 depending on the number of subframes needed to perform the free operations) to perform free operations in 510.

Each subframe of RAT2 selected for free operations may result in further missed subframes for RAT1, i.e. missed free subframes. RAT2 may additionally recalculate the cumulative probability for each of the updated remaining subframes of RAT1 in 512, i.e. the subframes of RAT1 that are not missed locked subframes, missed free subframes, or missed other subframes. For example, RAT2 may utilize the probabilistic retransmission strategy model obtained in 504 to determine the cumulative probabilities that the updated remaining subframes of RAT1 contain a transmission or retransmission of a data block of a missed locked, missed free, or missed other subframe of RAT1. Similarly to as detailed above, RAT1 may use an arithmetic summing operation to sum the probabilities for each missed locked, missed free, and missed other subframe of RAT1 to obtain the cumulative probability for each updated remaining subframe of RAT1.

Depending on the nature of the free operations of RAT2, RAT2 may need to select multiple subframes of RAT2 to use for free operations. For example, RAT2 may need to select an appropriate number of subframes of RAT2 in order to perform a plurality of radio measurements, where the number of subframes may depend on the desired radio measurements (e.g. intra-frequency measurements, inter-frequency measurements, and/or inter-RAT measurements). In such a scenario where RAT2 needs to select multiple subframes of RAT2 for free operations, RAT2 may recalculate the cumulative probabilities in 512 following selection of each subframe of RAT2 (e.g. for each successive subframe selection for RAT2 that results in another subframe of RAT1 being missed), i.e. in an iterative manner. Alternatively RAT2 may recalculate the cumulative probabilities in 512 after all necessary subframes of RAT2 have been selected for free operations.

Following selection of subframes for free operations of RAT2 in 510 and recalculation of cumulative probabilities in 512, RAT2 may perform the scheduled free and locked radio operations during the corresponding subframes of RAT2 in 514. Accordingly, baseband system 206 may control RF transceiver 204 to receive data for RAT2 during the subframes of RAT2 selected for free and locked radio operations, i.e. during the missed locked and missed free subframes of RAT1. Baseband system 206 may control RF transceiver 204 to receive data for RAT1 during the updated remaining subframes of RAT1, i.e. the subframes of RAT1 that are not missed due to locked or free operations of RAT2. Method 500 may end at 516.

It is appreciated that baseband system 206 may continuously repeat method 500, such as according to a set period, in order to minimize the occurrence of multiple retransmissions of the same data block for RAT1 over an extended period of time. Furthermore, it is understood that method 500, partially or in its entirety, may be performed at varying points in time relative to the scheduled radio operations of RAT1 and RAT2. For example, baseband system 206 may have prior knowledge of the locked radio operations of RAT2 (paging occasions and system information reads) far in advance, and accordingly may be able to schedule free operations for RAT2 while fully considering the probabilistic retransmission strategy model (both for remaining subframes occurring before and after each missed locked subframe) for the network of RAT1 (e.g. dependent on the observed retransmission delay with the largest delay value). Alternatively, baseband system 206 may not be able to schedule free operations for RAT2 far in advance, and accordingly may not fully consider the probabilistic retransmission strategy model for the network of RAT1, e.g. by only looking at the remaining subframes occurring after each missed locked subframe. Similarly, it may be impossible for RAT1 to detect occurrence of a missed other subframe until after the missed other subframe has concluded, i.e. by detecting that a data block was not successfully received during the missed other subframe. Accordingly, RAT2 may only be able to apply the probabilistic retransmission strategy model for remaining subframes occurring after missed other subframes.

The above description of method 500 details that specific operations of method 500 may be performed by RAT1 and/or RAT2, e.g. digital processing circuit(s) 302a and 304a in accordance with control logic provided by executed software and/or firmware modules. Alternatively, one or more separate components may be provided in baseband system 206, such as a dedicated microprocessor/microcontroller adapted to interact with RAT1 and RAT2, that may alternatively perform part or all of method 500 and provide any results to RAT1 or RAT2.

By obtaining a probabilistic retransmission strategy model of the network of RAT1, baseband system 206 may thus be able to selectively schedule certain radio operations of RAT2 in order to reduce the occurrences of multiple retransmissions of the same data block for RAT1. Baseband system 206 may be configured to apply selective scheduling based on retransmission probabilities for any radio access technology and associated radio activities, and accordingly is not limited to certain radio activities, radio access technologies, radio connectivity states, etc. As detailed above regarding 504 of method 500, baseband system 206 may calculate the retransmission strategy model by observing retransmissions for RAT1 during an observation period and evaluating the distribution of retransmission delays for each retransmission. While the above description for 504 detailed an equal weighting approach for each observed retransmission delay, baseband system 206 may alternatively weight each observed retransmission, such as by giving greater weight to more recent observed retransmissions than older retransmissions.

For example, baseband system 206 may apply a weight vector α to each observed retransmission to calculate the probability for each possible retransmission delay as follows:

$$P_{occurrence}(k) = \frac{\sum \alpha(\text{single time occurrence} == t_{delay})}{\sum \alpha}.$$

Accordingly, baseband system 206 may select weight vector α in order to more heavily weight recently observed retransmissions relative to older observed retransmissions. Such may allow baseband system 206 to quickly react to adjustments in the retransmission strategy of the network for RAT1. For example, baseband system 206 may observe the following sequence of retransmissions during the observation period, from older to more recent:

16, 16, 8, 14, 14, 8, 16, 16, 8, 8, 16, 16, 16, 8, 8, 8, 16, 8, 8, 8.

Table 2 below shows the distribution of the observed retransmission delays with the previous (unweighted) metric and new (weighted) metric after applying an arbitrary weight vector α:

TABLE 2

| Time delay (ms) | # of Occurrences | Unweighted | Weighted |
| --- | --- | --- | --- |
| 8 | 10 | 0.5 | 0.57 |
| 14 | 2 | 0.1 | 0.07 |
| 16 | 8 | 0.4 | 0.36 |
| Rest | 0 | 0.0 | 0.0 |

Accordingly, as baseband system 206 recently observed numerous 8 ms retransmission delays compared to 14 and 16 ms retransmission delays, baseband system 206 may calculate a higher weighted metric for 8 ms retransmission delays due to the application of arbitrary weight vector α. Such may be effective in adapting to recent changes in retransmission behavior of the network for RAT1, as recent observations are more heavily weighted during probability calculations than older observations. Baseband modem 206 may generate and apply a probabilistic retransmission strategy model using weighted metrics in an analogous manner as detailed above regarding 504.

Furthermore, there may exist additional mediums for baseband system 206 to obtain a probabilistic retransmission strategy model for RAT1. For example, baseband system 206 may receive information about the retransmission strategy model from the network for RAT1, or may rely on further criteria to derive the probabilistic retransmission strategy model. Many such variations that result in obtaining a probabilistic retransmission strategy model are thus recognized as possible.

Additionally or alternatively, baseband system 206 may provide extra consideration to the possibility of three, four, or more retransmissions, and may check for the possibility of more than two retransmissions occurring. Baseband system 206 may then place greater consideration on avoiding three or more retransmissions for RAT1 when scheduling free operations for RAT2.

Additionally or alternatively, baseband system 206 may attempt to schedule free operations for RAT2 to maximize the sleep time for RAT1 and/or RAT2. For example, baseband system 206 may attempt to schedule free operations for RAT2 as close as possible to locked radio operations of RAT2, which may allow RAT1 to enter a sleep state (in the absence of any uplink transmissions by RAT1) for the duration of both the free and locked radio operations. Accordingly, remaining subframes of RAT1 that are proximate to missed locked subframes of RAT1 may be considered more suitable for placement of free operations for RAT2 than remaining subframes of RAT2 that are not proximate to any missed blocked subframes. For example, a remaining subframe of RAT1 having a cumulative probability of 0.46 that is 6 ms from a missed locked subframe of RAT1 may be defined as more suitable for placement of a free operation for RAT2 than a remaining subframe of RAT1 having a cumulative probability of 0.19 that is 25 ms from a missed locked subframe of RAT1. Such decision logic may be implemented in the control logic of the software/firmware modules executed at RAT1 and RAT2 e.g. in order to adjust selection of subframes of RAT2 to perform free operations in 510.

Additionally and/or alternatively, method 500 may be expanded to consider uplink transmission gaps for RAT1 that are intended to reduce receiver desensitization for reception for RAT2. For example, baseband system 206 and RF transceiver 204 may be configured to allow one of RAT1 or RAT2 to transmit concurrently to reception by the other of RAT1 or RAT2. However, transmission by one RAT system concurrent to reception by the other RAT system may interfere with the receiving RAT system. Accordingly, baseband system 206 may need to ensure that RAT1 does not transmit during reception operations by RAT2, which may include both the locked and free operations detailed above.

Accordingly, RAT1 may inevitably be prevented from transmitting during subframes for RAT1 than conflict with locked radio operations by RAT2. Similarly to as detailed above regarding method 500, RAT2 may need to select subframes of RAT2 to perform free operations while considering the transmission operations of RAT1. For example, RAT1 may need to transmit an ACK/NACK 4 ms following each received data block (e.g. in an LTE context), i.e. both initial transmissions and retransmissions of data blocks. Accordingly, RAT2 may similarly apply a probabilistic retransmission strategy model of the network for RAT1 to identify subframes of RAT1 during which RAT1 will likely need to transmit an ACK/NACK, e.g. by adjusting the probabilistic retransmission strategy model according to a 4 ms shift to identify subframes of RAT1 that RAT1 will likely need to transmit an ACK/NACK for an initial transmission or retransmission.

Accordingly, RAT2 may select remaining subframes of RAT1 that have a low probability of containing an ACK/NACK transmission by RAT1 according to the probabilistic retransmission strategy model. RAT2 may then schedule free operations in subframes of RAT2 corresponding to these remaining subframes of RAT1, thereby reducing the likelihood that RAT1 will not be able to transmit an ACK/NACK. Such may additionally reduce the occurrence of multiple retransmissions for RAT1, as skipped ACKs/NACKs by RAT1 may additionally result in retransmissions by the network for RAT1.

Baseband system 206 may in particular consider the proximity of remaining subframes to missed locked subframes of RAT1 when scheduling free operations for RAT2 in observance of transmission gaps for RAT1. As RAT1 may need to suspend transmission during both missed locked and missed free subframes, RAT1 may not perform any reception or transmission operations during missed subframes. Accordingly, it may be advantageous to schedule missed free subframes of RAT1 in close proximity to missed locked subframes as RAT1 may be able to enter a sleep state for the duration of the missed locked and missed free subframes in addition to any intervening subframes.

While the above description has treated radio operations such as paging occasions and system information reads as "locked" radio operations, baseband system 206 may have limited flexibility in selectively receiving and/or skipping certain such radio operations. For example, in a GSM context RAT2 may be configured to receive 4 repetitive paging bursts, where each paging burst contains the same paging information. Accordingly, RAT2 may be able to "skip" reception of one or more of the 4 paging bursts and rely on the received paging bursts to recover the contained paging information. RAT2 may thus be able to select one or more of the paging bursts to skip, thus releasing one or more subframes of RAT1 previously designated as missed locked subframes. For example, RAT2 may be configured to apply the probabilistic retransmission strategy model for RAT1 to evaluate which of the subframes for RAT1 that conflict with paging bursts will be problematic, e.g. which of the missed locked subframes for RAT1 are most likely to contain data blocks contained in other missed locked (and/or missed free) subframes of RAT1. RAT2 may then decide to skip reception of one or more of the 4 paging bursts depending on the cumulative probabilities for the conflicting subframes of RAT1. Baseband system 206 may then be able to control RF transceiver 204 to perform reception for RAT1, thus minimizing the likelihood of multiple retransmissions for RAT1.

Additionally, RAT2 may consider recent reception performance when considering skipping of a paging burst, such as by evaluating whether recent Signal-to-Noise Ratio (SNR) metrics indicate strong channel quality. If the SNR metrics indicate strong channel quality (e.g. exceed a predetermined threshold), RAT2 may decide that skipping a paging burst is acceptable, and vice versa if the SNR metrics do not indicate strong channel quality. RAT2 may additionally be configured to consider both SNR metrics and the cumulative probabilities for conflicting subframes of RAT1 in the decision to skip one or more paging bursts.

RAT2 may similarly be configured to skip system information reads in order to allow RAT1 to perform reception during problematic subframes, i.e. subframes with relatively high cumulative probabilities of containing missed data blocks. RAT2 may need to perform system information reads at least once per a predefined duration of time, such as before the expiry of a resetting timer. Accordingly, RAT2 may select to perform such system information reads during subframes of RAT1 that have low probability of containing a missed data block, e.g. low cumulative probability relative to other subframes. RAT2 may thus allow RAT1 to perform reception during problematic subframes while performing system information reads during low probability subframes, thus reducing the likelihood of multiple retransmissions.

Figure 8:
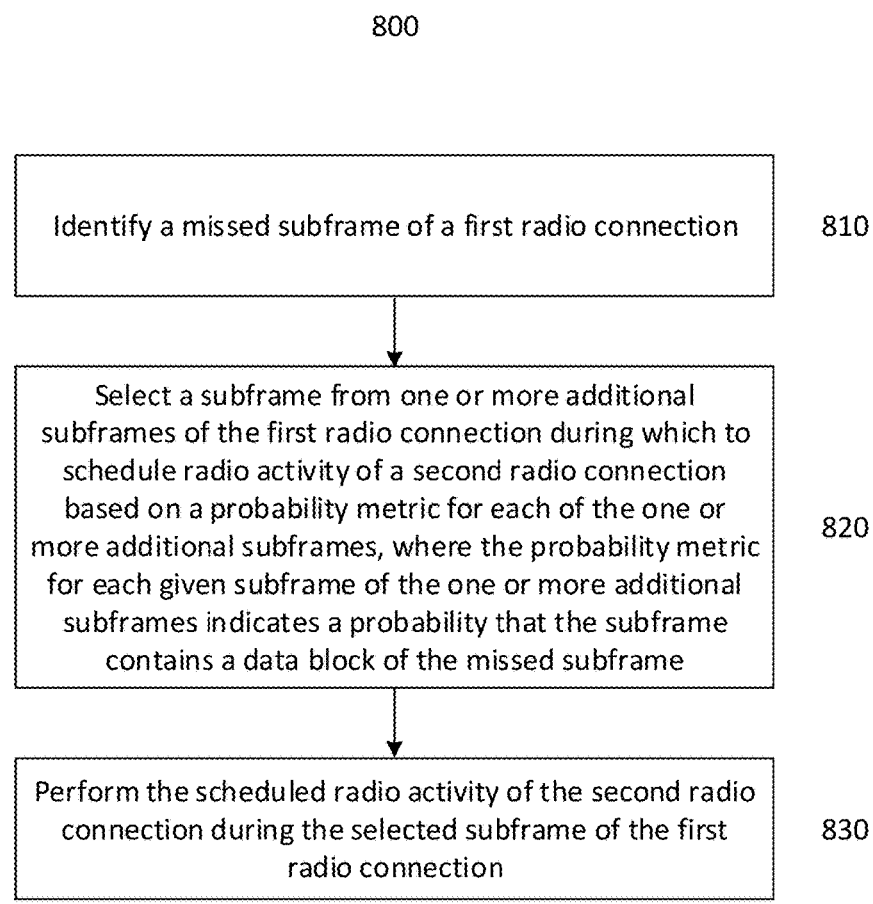
FIG. 8 shows a first method in a multi-SIM device.

FIG. 8 shows method 800, which may be a method in a mobile communication device. Method 800 may include identifying a missed subframe of a first radio connection (810), selecting a subframe from one or more additional subframes of the first radio connection during which to schedule radio activity of a second radio connection based on a probability metric for each of the one or more additional subframes (820), where the probability metric for each given subframe of the one or more additional subframes indicates a probability that the subframe contains a data block of the missed subframe, and performing the scheduled radio activity of the second radio connection during the selected subframe of the first radio connection (830).

In one or more further exemplary aspects of the disclosure, one or more of the features described above in reference to FIGS. 1-7 may be further incorporated into method 800. In particular, method 800 may be configured to perform further and/or alternate processes as detailed regarding mobile terminal 200 and/or baseband modem system 206.

Figure 9:
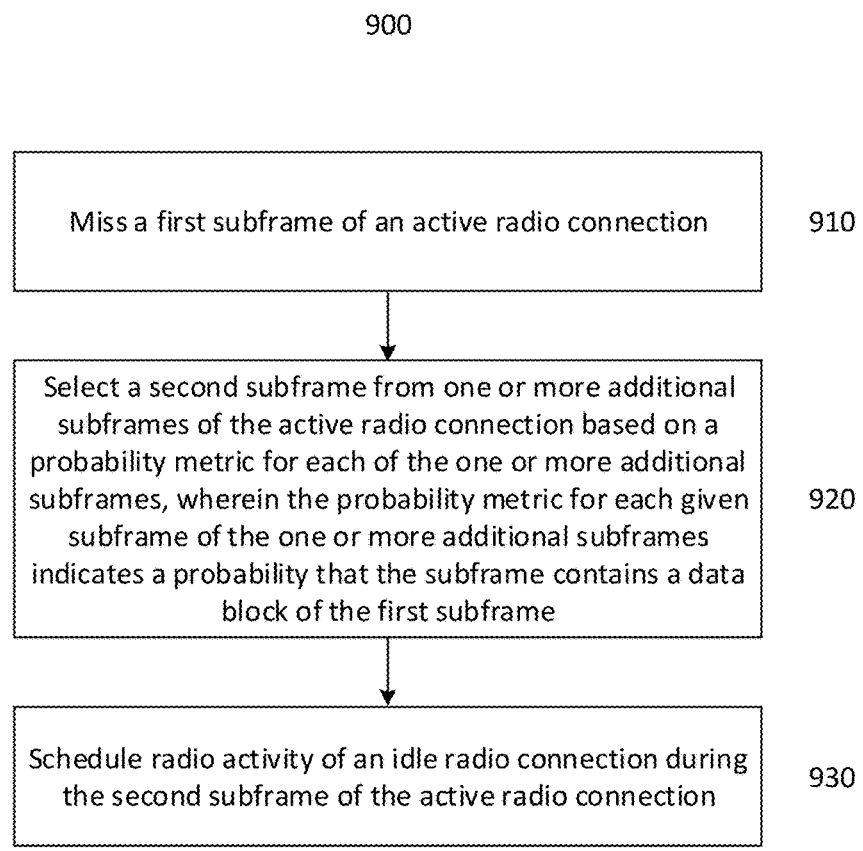
FIG. 9 shows a second method in a multi-SIM device.

FIG. 9 shows method 900, which may be a method in mobile communication device. Method 900 may include missing a first subframe of an active radio connection (910), selecting a second subframe from one or more additional subframes of the active radio connection based on a probability metric for each of the one or more additional subframes (920), wherein the probability metric for each given subframe of the one or more additional subframes indicates a probability that the subframe contains a data block of the first subframe, and scheduling radio activity of an idle radio connection during the second subframe of the active radio connection (930).

In one or more further exemplary aspects of the disclosure, one or more of the features described above in reference to FIGS. 1-7 may be further incorporated into method 900. In particular, method 900 may be configured to perform further and/or alternate processes as detailed regarding mobile terminal 200 and/or baseband modem system 206.

Figure 10:
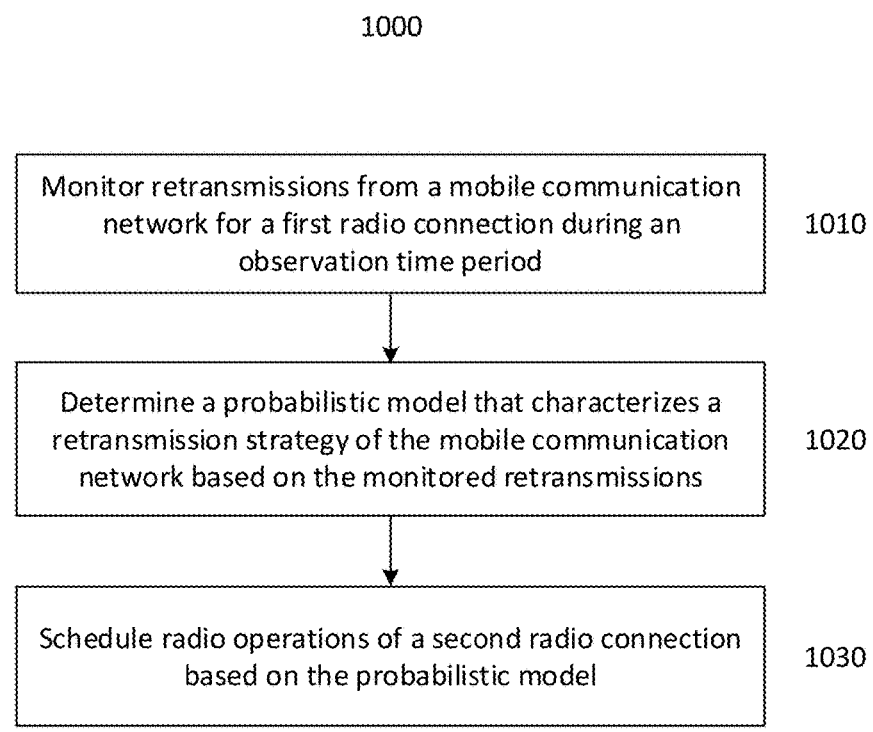
FIG. 10 shows a method for scheduling radio activity in a multi-SIM device.

FIG. 10 shows method 1000 for scheduling radio activity in a mobile communication device. Method 1000 includes monitoring retransmissions from a mobile communication network for a first radio connection during an observation time period (1010), determining a probabilistic model that characterizes a retransmission strategy of the mobile communication network based on the monitored retransmissions (1020), and scheduling radio operations of a second radio connection based on the probabilistic model (1030).

In one or more further exemplary aspects of the disclosure, one or more of the features described above in reference to FIGS. 1-7 may be further incorporated into method 1000. In particular, method 1000 may be configured to perform further and/or alternate processes as detailed regarding mobile terminal 200 and/or baseband modem system 206.

While the above description may focus on certain radio access technologies and radio connectivity states, it is appreciated that the detailed aspects of this disclosure are considered demonstrative in nature, and accordingly may be applied to other mobile devices that support multiple radio connections with the same or different radio access technologies, numbers of SIMs, and/or radio connectivity states. Furthermore, the implementations detailed herein may apply to conflicts for any type of radio activity for multiple radio connections, and thus may not be limited to the aforementioned "free" and "locked" operations explicitly detailed herein.

It is appreciated that the terms "user equipment", "UE", "mobile terminal", mobile device, etc., may apply to any wireless communication device, including cellular phones, tablets, laptops, personal computers, and any number of additional electronic devices.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following Examples pertain to further aspects of this disclosure:

Example 1 is a method in a mobile communication device including identifying a missed subframe of a first radio connection, selecting a subframe from one or more additional subframes of the first radio connection during which to schedule radio activity of a second radio connection based on a probability metric for each of the one or more additional subframes, where the probability metric for each given subframe of the one or more additional subframes indicates a probability that the subframe contains a data block of the missed subframe, and performing the scheduled radio activity of the second radio connection during the selected subframe of the first radio connection.

In Example 2, the subject matter of Example 1 can optionally further include missing the missed subframe of the first radio connection.

In Example 3, the subject matter of Example 1 or 2 can optionally further include scheduling a radio gap for the first radio connection during the selected subframe of the first radio connection.

In Example 4, the subject matter of any one of Examples 1 to 3 can optionally include wherein the performing the scheduled radio activity of the second radio connection during the selected subframe of the first radio connection includes performing one or more radio measurements during the selected subframe of the first radio connection.

In Example 5, the subject matter of any one of Examples 1 to 4 can optionally include wherein the performing the scheduled radio activity of the second radio connection during the selected subframe causes the mobile communication device to miss the selected subframe of the first radio connection.

In Example 6, the subject matter of any one of Examples 1 to 5 can optionally further include scheduling a radio gap for the first radio connection during the missed subframe of the first radio connection, and performing further radio activity for the second radio connection during the scheduled radio gap for the first radio connection.

In Example 7, the subject matter of Example 6 can optionally include wherein the performing further radio activity for the second radio connection during the scheduled radio gap for the first radio connection includes receiving a paging message, receiving a system information message, or performing a radio measurement for the second radio connection during the scheduled radio gap for the first radio connection.

In Example 8, the subject matter of Example 6 can optionally include wherein the scheduled radio gap for the first radio connection is a reception gap.

In Example 9, the subject matter of Example 6 can optionally include wherein the scheduled radio gap for the first radio connection is a transmission gap.

In Example 10, the subject matter of any one of Examples 1 to 9 can optionally include wherein the probability metric for each given subframe of the one or more additional subframes indicates the probability that the subframe contains an initial transmission or a retransmission of a data block of the first subframe.

In Example 11, the subject matter of any one of Examples 1 to 10 can optionally include wherein the selecting a subframe from one or more additional subframes of the first radio connection during which to schedule radio activity of a second radio connection based on a probability metric for each of the one or more additional subframes includes selecting a subframe from the one or more additional subframes of the first radio connection that has a minimum probability metric as the selected subframe, where low probability metrics indicate a low probability that a given subframe of the one or more additional subframes of the first radio connection contains a data block of the missed subframe.

In Example 12, the subject matter of any one of Examples 1 to 10 can optionally include wherein the selecting a subframe from the one or more additional subframes of the first radio connection that has a minimum probability metric as the selected subframe includes selecting a subframe from the one or more additional subframes of the first radio connection with the lowest probability metric as the selected subframe, where low probability metrics indicate a low probability that a given subframe of the one or more additional subframes of the first radio connection contains a data block of the missed subframe.

In Example 13, the subject matter of any one of Examples 1 to 12 can optionally further include missing a further subframe of the first radio connection, wherein the probability metric for each given subframe of the one or more additional subframes indicates a cumulative probability that the subframe contains a data block of the missed subframe or a data block of the further subframe.

In Example 14, the subject matter of Example 1 can optionally include wherein the identifying a missed subframe of the first radio connection includes identifying a subframe of the first radio connection that is missed due to a scheduled radio gap of the first radio connection as the missed subframe, or identifying a subframe of the first radio connection that is missed due to unsuccessful reception as the missed subframe.

In Example 15, the subject matter of any one of Examples 1 to 14 can optionally further include monitoring retransmissions for the first radio connection during an observation time period, and calculating the probability metric for each of the one or more additional subframes of the first radio connection based on the monitored retransmissions.

In Example 16, the subject matter of Example 15 can optionally include wherein the calculating the probability metric for each of the one or more additional subframes of the first radio connection based on the monitored retransmissions includes for each of the monitored retransmissions, determining a retransmission delay time between the monitored transmission and a corresponding initial transmission, and calculating the probability metric for each of the one or more additional subframes of the first radio connection based on the retransmission delay time for each of the monitored retransmissions.

In Example 17, the subject matter of Example 16 can optionally include wherein the calculating the probability metric for each of the one or more additional subframes of the first radio connection based on the monitored retransmissions further includes determining the number of occurrences of each possible retransmission delay time based on the determined retransmission delay times, and calculating the probability metric for each of the one or more additional subframes of the first radio connection based on the number of occurrences of each possible retransmission delay time and the total number of monitored retransmissions.

In Example 18, the subject matter of any one of Examples 1 to 14 can optionally further include monitoring retransmissions for the first radio connection during an observation time period, determining a retransmission strategy model based on the monitored retransmissions, and calculating the probability metric for each of the one or more additional subframes of the first radio connection based on the retransmission strategy model.

In Example 19, the subject matter of Example 1 can optionally further include calculating the probability metric for each of the one or more additional subframes of the first radio connection.

In Example 20, the subject matter of any one of Examples 1 to 19 can optionally include wherein the mobile communication device is configured to allow only one of either the first radio connection or the second radio connection to receive data at a time.

In Example 21, the subject matter of any one of Examples 1 to 20 can optionally include wherein the first radio connection is an active radio connection and the second radio connection is in an idle radio connection.

In Example 22, the subject matter of any one of Examples 1 to 21 can optionally include wherein the first radio connection is a radio connection for a Long Term Evolution (LTE) radio access technology, a Universal Mobile Telecommunication System (UMTS) radio access technology, a Global System for Mobile Communications (GSM) radio access technology, Bluetooth radio access technology, or a WiFi radio access technology.

In Example 23, the subject matter of any one of Examples 1 to 22 can optionally include wherein the second radio connection is a radio connection for a Long Term Evolution (LTE) radio access technology, a Universal Mobile Telecommunication System (UMTS) radio access technology, a Global System for Mobile Communications (GSM) radio access technology, Bluetooth radio access technology, or a WiFi radio access technology.

In Example 24, the subject matter of any one of Examples 1 to 23 can optionally include wherein the first radio connection and the second radio connection are connected to different Cellular Wide Area radio communication networks.

In Example 25, the subject matter of any one of Examples 1 to 24 can optionally include wherein the first radio connection is a radio connection for a different radio access technology than the second radio connection.

In Example 26, the subject matter of any one of Examples 1 to 25 can optionally include wherein the first radio connection is a radio connection of a first SIM of the mobile communication device and the second radio connection is a radio connection of a second SIM of the mobile communication device.

In Example 27, the subject matter of any one of Examples 1 to 25 can optionally include wherein the mobile communication device is a multi-SIM device configured according to a Dual-SIM Dual-Standby (DSDS) design, and wherein the first radio connection is a radio connection of a first SIM of the mobile communication device and the second radio connection is a radio connection of a second SIM of the mobile communication device.

Example 28 is a mobile terminal device configured to perform the method of any one of Examples 1 to 27.

Example 29 is a multi-SIM mobile terminal device configured to perform the method of any one of Examples 1 to 25, the multi-SIM mobile terminal device including a first SIM corresponding to the first radio connection and a second SIM corresponding to the second radio connection.

Example 30 is a method in a mobile communication device, the method including missing a first subframe of an active radio connection, selecting a second subframe from one or more additional subframes of the active radio connection based on a probability metric for each of the one or more additional subframes, wherein the probability metric for each given subframe of the one or more additional subframes indicates a probability that the subframe contains a data block of the first subframe, and scheduling radio activity of an idle radio connection during the second subframe of the active radio connection.

In Example 31, the subject matter of Example 30 can optionally further include performing the scheduled radio activity of the idle radio connection during the second subframe of the active radio connection.

In Example 32, the subject matter of Example 31 can optionally further include scheduling a radio gap for the active radio connection during the second subframe of the active radio connection.

In Example 33, the subject matter of Example 31 can optionally include wherein the performing the scheduled radio activity of the idle radio connection during the second subframe of the active radio connection includes performing one or more radio measurements during the second subframe of the active radio connection.

In Example 34, the subject matter of Example 31 can optionally include wherein the performing the scheduled radio activity of the idle radio connection during the second subframe of the active radio connection causes the mobile communication device to miss the second subframe of the active radio connection.

In Example 35, the subject matter of any one of Examples 30 to 34 can optionally include wherein the missing a first subframe of an active radio connection includes scheduling a radio gap for the active radio connection during the first subframe of the active radio connection, and performing further radio activity for the idle radio connection during the scheduled radio gap for the active radio connection.

In Example 36, the subject matter of Example 35 can optionally include wherein the performing further radio activity for the idle radio connection during the scheduled radio gap for the active radio connection includes receiving a paging message, receiving a system information message, or performing a radio measurement for the idle radio connection during the scheduled radio gap for the active radio connection.

In Example 37, the subject matter of Example 35 can optionally include wherein the scheduled radio gap for the active radio connection is a reception gap.

In Example 38, the subject matter of Example 35 can optionally include wherein the scheduled radio gap for the active radio connection is a transmission gap.

In Example 39, the subject matter of any one of Examples 30 to 38 can optionally include wherein the probability metric for each given subframe of the one or more additional subframes indicates a probability that the subframe contains an initial transmission or a retransmission of a data block of the first subframe.

In Example 40, the subject matter of any one of Examples 30 to 39 can optionally include wherein the selecting a second subframe from one or more additional subframes of the active radio connection based on a probability metric for each of the one or more additional subframes includes selecting a subframe from the one or more additional subframes of the active radio connection that has a minimum probability metric as the second subframe, where low probability metrics indicate a low probability that a given subframe of the one or more additional subframes of the active radio connection contains a data block of the first subframe.

In Example 41, the subject matter of any one of Examples 30 to 39 can optionally include wherein the selecting a second subframe from one or more additional subframes of the active radio connection based on a probability metric for each of the one or more additional subframes includes selecting a subframe from the one or more additional subframes of the active radio connection with the lowest probability metric as the second subframe, where low probability metrics represent a low probability that a given subframe of the one or more additional subframes of the active radio connection contains a data block of the first subframe.

In Example 42, the subject matter of any one of Examples 30 to 41 can optionally further include missing a third subframe of the active radio connection, wherein the probability metric for each given subframe of the one or more additional subframes indicates a cumulative probability that the subframe contains a data block of the first subframe or a data block of the third subframe.

In Example 43, the subject matter of Example 30 can optionally include wherein the missing a first subframe of an active radio connection includes missing the first subframe of the active radio connection due to a scheduled radio gap of the active radio connection, or missing the first subframe of the active radio connection due to unsuccessful reception.

In Example 44, the subject matter of any one of Examples 30 to 43 can optionally further include missing the first subframe of the active radio connection prior to selecting the second subframe from the one or more additional subframes of the active radio connection based on the probability metric for each of the one or more additional subframes.

In Example 45, the subject matter of any one of Examples 30 to 43 can optionally further include selecting the second subframe from the one or more additional subframes of the active radio connection based on the probability metric for each of the one or more additional subframes prior to missing the first subframe of the active radio connection.

In Example 46, the subject matter of any one of Examples 30 to 45 can optionally further include monitoring retransmissions for the active radio connection during an observation time period, and calculating the probability metric for each of the one or more additional subframes of the active radio connection based on the monitored retransmissions.

In Example 47, the subject matter of Example 46 can optionally include wherein the calculating the probability metric for each of the one or more additional subframes of the active radio connection based on the monitored retransmissions includes for each of the monitored retransmissions, determining a retransmission delay time between the monitored retransmission and a corresponding initial transmission, and calculating the probability metric for each of the one or more additional subframes of the active radio connection based on the retransmission delay for each of the monitored retransmissions.

In Example 48, the subject matter of Example 47 can optionally include wherein the calculating the probability metric for each of the one or more additional subframes of the active radio connection based on the monitored retransmissions further includes determining the number of occurrences of each possible retransmission delay time based on the determined retransmission delay times, and calculating the probability metric for each of the one or more additional subframes of the active radio connection based on the number of occurrences of each possible retransmission delay time and the total number of monitored retransmissions.

In Example 49, the subject matter of any one of Examples 30 to 45 can optionally further include monitoring retransmissions for the active radio connection during an observation time period, determining a retransmission strategy model based on the monitored retransmissions, and calculating the probability metric for each of the one or more additional subframes of the first SIM based on the retransmission strategy model.

In Example 50, the subject matter of Example 30 can optionally further include calculating the probability metric for each of the one or more additional subframes of the active radio connection.

In Example 51, the subject matter of Example 30 can optionally further include performing further radio activity of the idle radio connection during the first subframe of the active radio connection, wherein the further radio activity causes the first subframe of the active radio connection to be missed.

In Example 52, the subject matter of any one of Examples 30 to 51 can optionally include wherein the mobile communication device is configured to allow only one of either the active radio connection or the idle radio connection to receive data at a time.

In Example 53, the subject matter of any one of Examples 30 to 52 can optionally include wherein the active radio connection is a radio connection for a Long Term Evolution (LTE) radio access technology, a Universal Mobile Telecommunication System (UMTS) radio access technology, a Global System for Mobile Communications (GSM) radio access technology, Bluetooth radio access technology, or a WiFi radio access technology.

In Example 54, the subject matter of any one of Examples 30 to 53 can optionally include wherein the idle radio connection is a radio connection for a Long Term Evolution (LTE) radio access technology, a Universal Mobile Telecommunication System (UMTS) radio access technology, a Global System for Mobile Communications (GSM) radio access technology, Bluetooth radio access technology, or a WiFi radio access technology.

In Example 55, the subject matter of any one of Examples 30 to 54 can optionally include wherein the active radio connection and the idle radio connection are connected to different Cellular Wide Area radio communication networks.

In Example 56, the subject matter of any one of Examples 30 to 55 can optionally include wherein the active radio connection is a radio connection for a different radio access technology than the idle radio connection.

In Example 57, the subject matter of any one of Examples 30 to 56 can optionally include wherein the mobile communication device is configured according to a Dual-SIM Dual-Standby (DSDS) design, and wherein the active radio connection is a radio connection of a first SIM of the mobile communication device and the idle radio connection is a radio connection of a second SIM of the mobile communication device.

In Example 58, the subject matter of any one of Examples 30 to 56 can optionally include wherein the active radio connection is a radio connection of a first SIM of the mobile communication device and the idle radio connection is a radio connection of a second SIM of the mobile communication device.

Example 59 is a mobile terminal device including a radio processing circuit and a baseband modem, the baseband modem configured to perform the method of any one of Examples 30 to 58.

Example 60 is a multi-SIM mobile terminal device configured to perform the method of any one of Examples 30 to 56, the multi-SIM mobile terminal device including a first SIM corresponding to the active radio connection and a second SIM corresponding to the idle radio connection.

Example 61 is a method for scheduling radio activity in mobile communication device, the method including monitoring retransmissions from a mobile communication network for a first radio connection during an observation time period, determining a probabilistic model that characterizes a retransmission strategy of the mobile communication network based on the monitored retransmissions, and scheduling radio operations of a second radio connection based on the probabilistic model.

In Example 62, the subject matter of Example 61 can optionally further include identifying a missed subframe of the first radio connection, selecting a subframe of the first radio connection having a low probability of containing a data block of the missed subframe according to the probabilistic model, and scheduling a radio activity of the second radio connection during the selected subframe.

In Example 63, the subject matter of Example 62 can optionally further include performing the scheduled radio activity of the second radio connection during the selected subframe, wherein the performing the scheduled radio activity of the second radio connection causes the first radio connection to miss the selected subframe.

In Example 64, the subject matter of Example 62 can optionally further include scheduling a radio gap for the first radio connection during the selected subframe.

In Example 65, the subject matter of Example 62 can optionally further include scheduling a radio gap for the first radio connection during the missed subframe of the first radio connection, and performing further radio activity of the second radio connection during the scheduled radio gap for the first radio connection.

In Example 66, the subject matter of Example 65 can optionally include wherein the performing further radio activity for the second radio connection during the scheduled radio gap for the first radio connection includes receiving a paging message, receiving a system information message, or performing a radio measurement for the second radio connection during the scheduled radio gap for the first radio connection.

In Example 67, the subject matter of Example 65 can optionally include wherein the scheduled radio gap for the first radio connection is a reception gap.

In Example 68, the subject matter of Example 65 can optionally include wherein the scheduled radio gap for the first radio connection is a transmission gap.

In Example 69, the subject matter of Example 61 can optionally further include determining a probability metric for one or more additional subframes of the first radio connection based on the probabilistic model, where the probability metric for each given subframe of the one or more additional subframes indicates a probability that the subframe contains a data block of a missed subframe of the first radio connection.

In Example 70, the subject matter of Example 69 can optionally include wherein the probability metric for each given subframe of the one or more additional subframes indicates a probability that the subframe contains an initial transmission or a retransmission of the data block of the missed subframe of the first radio connection.

In Example 71, the subject matter of Example 69 can optionally include wherein the scheduling radio operations of a second radio connection based on the probabilistic model includes selecting a subframe from the one or more additional subframes of the first radio connection to schedule radio activity for the second radio connection based on the probability metric of each of the one or more additional subframes, and scheduling a radio gap for the first radio connection during the selected subframe.

In Example 72, the subject matter of Example 61 can optionally include wherein the scheduling radio operations of a second radio connection based on the probabilistic model includes selecting a subframe from the one or more additional subframes of the first radio connection during which to schedule radio activity for the second radio connection based on the probabilistic model, wherein the selected subframe has a low probability of containing a data block of a missed subframe of the first radio connection according to the probabilistic model.

In Example 73, the subject matter of Example 72 can optionally further include scheduling a radio gap for the first radio connection during the selected subframe, and performing the scheduled radio activity for the second radio connection during the selected subframe.

In Example 74, the subject matter of any one of Examples 61 to 73 can optionally include wherein the determining a probabilistic model that characterizes a retransmission strategy of the mobile communication network includes monitoring retransmissions from the mobile communication network for the first radio connection during an observation time period, and calculating the probabilistic model based on the monitored retransmissions.

In Example 75, the subject matter of Example 74 can optionally include wherein the probabilistic model estimates the probable timing of a retransmission relative to an initial transmission by the mobile communication network.

In Example 76, the subject matter of Example 74 or 75 can optionally include wherein the calculating the probabilistic model based on the monitored retransmissions includes for each of the monitored retransmissions, determining a retransmission delay time between the monitored transmission and a corresponding initial transmission by the mobile communication network, and determining the number of occurrences of each possible retransmission delay time based on the determined retransmission delay times.

In Example 77, the subject matter of Example 76 can optionally include wherein the calculating the probabilistic model based on the monitored retransmissions further includes calculating the probabilistic model with the number of occurrences of each possible retransmission delay time and the total number of monitored retransmissions.

In Example 78, the subject matter of any one of Examples 74 to 77 can optionally include wherein the probabilistic model estimates the probable timing of a retransmission relative to an initial transmission by the mobile communication network.

In Example 79, the subject matter of Example 61 can optionally further include identifying one or more missed subframes of the first radio connection, and wherein the scheduling radio operations of the second radio connection based on the probabilistic model includes scheduling radio activity of the second radio connection during a subframe of the first radio connection that has a low probability of containing a data block of the one or more missed subframes of the first radio connection according to the probabilistic model.

In Example 80, the subject matter of Example 79 can optionally include wherein the identifying one or more missed subframes of the first radio connection includes identifying one or more subframes of the first radio connection that are missed due to a scheduled radio gap of the first radio connection as missed subframes of the one or more missed subframes, or identifying one or more subframes of the first radio connection that are missed due to unsuccessful reception as missed subframes of the one or more missed subframes.

In Example 81, the subject matter of any one of Examples 61 to 80 can optionally include wherein the mobile communication device is configured to allow only one of either the first radio connection or the second radio connection to receive data at a time.

In Example 82, the subject matter of any one of Examples 61 to 81 can optionally include wherein the first radio connection is an active radio connection and the second SIM is an idle radio connection.

In Example 83, the subject matter of any one of Examples 61 to 82 can optionally include wherein the first radio connection is a radio connection for a Long Term Evolution (LTE) radio access technology, a Universal Mobile Telecommunications System (UMTS) radio access technology, a Global System for Mobile Communications (GSM) radio access technology, a Bluetooth radio access technology, or a WiFi radio access technology.

In Example 84, the subject matter of any one of Examples 61 to 83 can optionally include wherein the second radio connection is a radio connection for a Long Term Evolution (LTE) radio access technology, a Universal Mobile Telecommunication System (UMTS) radio access technology, a Global System for Mobile Communications (GSM) radio access technology, a Bluetooth radio access technology, or a WiFi radio access technology.

In Example 85, the subject matter of any one of Examples 61 to 84 can optionally include wherein the first radio connection is connected to the mobile communication network and the second radio connection is connected to a different mobile communication network than the first radio connection.

In Example 86, the subject matter of any one of Examples 61 to 85 can optionally include wherein the mobile communication device is a multi-SIM mobile terminal device configured according to a Dual-SIM Dual-Standby (DSDS) design, and wherein the first radio connection is a radio connection of a first SIM of the mobile communication device and the second radio connection is a radio connection of a second SIM of the mobile communication device.

In Example 87, the subject matter of any one of Examples 61 to 86 can optionally include wherein the first radio connection is a radio connection of a first SIM of the mobile communication device and the second radio connection is a radio connection of a second SIM of the mobile communication device.

Example 88 is a mobile terminal device including a radio processing circuit and a baseband modem, the baseband modem configured to perform the method of any one of Examples 62 to 87.

Example 89 is a multi-SIM mobile terminal device configured to perform the method of any one of Examples 62 to 85, the multi-SIM mobile terminal device including a first SIM corresponding to the first radio connection and a second SIM corresponding to the second radio connection.

Example 90 is a mobile terminal device including a radio processing circuit configured to receive and process radio frequency signals, and one or more baseband modems configured to identify a missed subframe of a first radio connection, select a subframe from one or more additional subframes of the first radio connection during which to schedule radio activity of a second radio connection based on a probability metric for each of the one or more additional subframes, where the probability metric for each given subframe of the one or more additional subframes indicates a probability that the subframe contains a data block of the missed subframe, and perform the scheduled radio activity of the second SIM during the selected subframe of the first radio connection.

In Example 91, the subject matter of Example 90 can optionally include wherein the one or more baseband modems are configured to control the radio processing circuit to receive radio frequency signals for the first radio connection and the second radio connection.

In Example 92, the subject matter of Example 90 or 91 can optionally include wherein the radio processing circuit is only capable of receiving radio frequency signals for either the first radio connection or the second radio connection at a time.

In Example 93, the subject matter of any one of Examples 90 to 92 can optionally include wherein the one or more baseband modems are further configured to miss reception of the missed subframe of the first radio connection.

In Example 94, the subject matter of any one of Examples 90 to 93 can optionally include wherein the one or more baseband modems are further configured to schedule a radio gap for the first radio connection during the selected subframe of the first radio connection.

In Example 95, the subject matter of any one of Examples 90 to 94 can optionally include wherein the performing the scheduled radio activity of the second radio connection during the selected subframe of the first radio connection includes performing one or more radio measurements during the selected subframe of the first radio connection.

In Example 96, the subject matter of any one of Examples 90 to 95 can optionally include wherein the performing the scheduled radio activity of the second radio connection during the selected subframe causes the one or more baseband modems to miss reception of the selected subframe of the first radio connection.

In Example 97, the subject matter of any one of Examples 90 to 96 can optionally include wherein the one or more baseband modems are further configured to schedule a radio gap for the first radio connection during the missed subframe of the first radio connection, and perform further radio activity for the second radio connection during the scheduled radio gap for the first radio connection.

In Example 98, the subject matter of Example 97 can optionally include wherein the performing further radio activity for the second radio connection during the scheduled radio gap for the first radio connection includes receiving a paging message, a system information message, or performing a radio measurement for the second radio connection during the scheduled radio gap for the first radio connection.

In Example 99, the subject matter of Example 97 can optionally include wherein the scheduled radio gap for the first radio connection is a reception gap.

In Example 100, the subject matter of Example 97 can optionally include wherein the scheduled radio gap for the first radio connection is a transmission gap.

In Example 101, the subject matter of any one of Examples 90 to 100 can optionally include wherein the probability metric for each given subframe of the one or more additional subframes indicates the probability that the subframe contains an initial transmission or a retransmission of a data block of the first subframe.

In Example 102, the subject matter of any one of Examples 90 to 101 can optionally include wherein the selecting a subframe from one or more additional subframes of the first radio connection during which to schedule radio activity of the second radio connection based on a probability metric for each of the one or more additional subframes includes selecting a subframe from the one or more additional subframes of the first radio connection that has a minimum probability metric as the selected subframe, where low probability metrics indicate a low probability that a given subframe of the one or more additional subframes of the first radio connection contains a data block of the missed subframe.

In Example 103, the subject matter of any one of Examples 90 to 101 can optionally include wherein the selecting a subframe from the one or more additional subframes of the first radio connection that has a minimum probability metric as the selected subframe includes selecting a subframe from the one or more additional subframes of the first radio connection with the lowest probability metric as the selected subframe, where low probability metrics indicate a low probability that a given subframe of the one or more additional subframes of the first radio connection contains a data block of the missed subframe.

In Example 104, the subject matter of any one of Examples 90 to 103 can optionally include wherein the one or more baseband modems are further configured to miss reception of a further subframe of the first radio connection, wherein the probability metric for each given subframe of the one or more additional subframes indicates a cumulative probability that the subframe contains a data block of the missed subframe or a data block of the further subframe.

In Example 105, the subject matter of Example 90 can optionally include wherein the identifying a missed subframe of the first radio connection includes identifying a subframe of the first radio connection that is missed due to a scheduled radio gap of the first radio connection as the missed subframe, or identifying a subframe of the first radio connection that is missed due to unsuccessful reception as the missed subframe.

In Example 106, the subject matter of any one of Examples 90 to 105 can optionally include wherein the one or more baseband modems are further configured to monitor retransmissions for the first radio connection during an observation time period, and calculate the probability metric for each of the one or more additional subframes of the first SIM based on the monitored retransmissions.

In Example 107, the subject matter of Example 106 can optionally include wherein the calculating the probability metric for each of the one or more additional subframes of the first radio connection based on the monitored retransmissions includes for each of the monitored retransmissions, determining a retransmission delay time between the monitored transmission and a corresponding initial transmission, and calculating the probability metric for each of the one or more additional subframes of the first radio connection based on the retransmission delay time for each of the monitored retransmissions.

In Example 108, the subject matter of Example 107 can optionally include wherein the calculating the probability metric for each of the one or more additional subframes of the first radio connection based on the monitored retransmissions further includes determining the number of occurrences of each possible retransmission delay time based on the determined retransmission delay times, and calculating the probability metric for each of the one or more additional subframes of the first radio connection based on the number of occurrences of each possible retransmission delay time and the total number of monitored retransmissions.

In Example 109, the subject matter of any one of Examples 90 to 105 can optionally include wherein the one or more baseband modems are further configured to monitor retransmissions for the first radio connection during an observation time period, determine a retransmission strategy model based on the monitored retransmissions, and calculate the probability metric for each of the one or more additional subframes of the first radio connection based on the retransmission strategy model.

In Example 110, the subject matter of Example 90 can optionally include wherein the one or more baseband modems are further configured to calculate the probability metric for each of the one or more additional subframes of the first radio connection.

In Example 111, the subject matter of any one of Examples 90 to 110 can optionally include wherein the one or more baseband modems are configured to allow only one of the first radio connection or the second radio connection to receive data at a time.

In Example 112, the subject matter of any one of Examples 90 to 111 can optionally include wherein the mobile terminal device is configured according to a Dual-Sim Dual-Standby (DSDS) design, and wherein the first radio connection is a radio connection of a first SIM of the mobile communication device and the second radio connection is a radio connection of a second SIM of the mobile communication device.

In Example 113, the subject matter of any one of Examples 90 to 111 can optionally further include a first SIM and a second SIM, wherein the first radio connection is a radio connection of the first SIM and the second radio connection is a radio connection of the second SIM.

In Example 114, the subject matter of any one of Examples 90 to 113 can optionally include wherein the first radio connection is in a radio active state and the second radio connection is in a radio idle state.

In Example 115, the subject matter of any one of Examples 90 to 114 can optionally include wherein the first radio connection is a radio connection for a Long Term Evolution (LTE) radio access technology, a Universal Mobile Telecommunication System (UMTS) radio access technology, a Global System for Mobile Communications (GSM) radio access technology, a Bluetooth radio access technology, or a WiFi radio access technology.

In Example 116, the subject matter of any one of Examples 90 to 115 can optionally include wherein the second radio connection is a radio connection for a Long Term Evolution (LTE) radio access technology, a Universal Mobile Telecommunication System (UMTS) radio access technology, a Global System for Mobile Communications (GSM) radio access technology, a Bluetooth radio access technology, or a WiFi radio access technology.

In Example 117, the subject matter of any one of Examples 90 to 116 can optionally include wherein the first radio connection and the second radio connection are connected to different Cellular Wide Area radio communication networks.

Example 118 is a mobile terminal device including a radio processing circuit configured to receive and process radio frequency signals, and one or more baseband modems configured to monitor retransmissions from a mobile communication network for an active radio connection during an observation time period, determine a probabilistic model that characterizes a retransmission strategy of the mobile communication network based on the monitored retransmissions, and schedule radio operations of a second radio connection based on the probabilistic model.

In Example 119, the subject matter of Example 118 can optionally include wherein the one or more baseband modems are configured to control the radio processing circuit to receive radio frequency signals for the first radio connection and the second radio connection.

In Example 120, the subject matter of Example 118 or 119 can optionally include wherein the radio processing circuit is only capable of receiving radio frequency signals for one of either the first radio connection or the second radio connection at a time.

In Example 121, the subject matter of any one of Examples 118 to 120 can optionally include wherein the one or more baseband modems are further configured to identify a missed subframe of the first radio connection, select a subframe of the first radio connection having a low probability of containing a data block of the missed subframe according to the probabilistic model, and scheduling a radio activity of the second radio connection during the selected subframe.

In Example 122, the subject matter of Example 121 can optionally include wherein the one or more baseband modems are further configured to perform the scheduled radio activity of the second radio connection during the selected subframe, wherein the performing the scheduled radio activity of the second radio connection causes the first radio connection to miss the selected subframe.

In Example 123, the subject matter of Example 121 can optionally include wherein the one or more baseband modems are further configured to schedule a radio gap for the first radio connection during the selected subframe.

In Example 124, the subject matter of Example 121 can optionally include wherein the one or more baseband modems are further configured to schedule a radio gap for the first radio connection during the missed subframe of the first radio connection, and perform further radio activity of the second radio connection during the scheduled radio gap for the first radio connection.

In Example 125, the subject matter of Example 118 can optionally include wherein the one or more baseband modems are further configured to determine a probability metric for one or more additional subframes of the first radio connection based on the probabilistic model, where the probability metric for each given subframe of the one or more additional subframes indicates a probability that the subframe contains a data block of a missed subframe of the first radio connection.

In Example 126, the subject matter of Example 125 can optionally include wherein the probability metric for each given subframe of the one or more additional subframes indicates a probability that the subframe contains an initial transmission or a retransmission of the data block of the missed subframe of the first radio connection.

In Example 127, the subject matter of Example 125 can optionally include wherein the scheduling radio operations of the second radio connection based on the probabilistic model includes selecting a subframe from the one or more additional subframes of the first radio connection to schedule radio activity for the second radio connection based on the probability metric of each of the one or more additional subframes, and scheduling a radio gap for the first radio connection during the selected subframe.

In Example 128, the subject matter of Example 118 can optionally include wherein the scheduling radio operations of the second radio connection based on the probabilistic model includes selecting a subframe from the one or more additional subframes of the first radio connection during which to schedule radio activity for the second radio connection based on the probabilistic model, wherein the selected subframe has a low probability of containing a data block of a missed subframe of the first radio connection according to the probabilistic model.

In Example 129, the subject matter of Example 128 can optionally include wherein the one or more baseband modems are further configured to schedule a radio gap for the first radio connection during the selected subframe, and perform the scheduled radio activity for the second radio connection during the selected subframe.

In Example 130, the subject matter of any one of Examples 118 to 129 can optionally include wherein the determining a probabilistic model that characterizes a retransmission strategy of the mobile communication network includes monitoring retransmissions from the mobile communication network for the first radio connection during an observation time period, and calculating the probabilistic model based on the monitored retransmissions.

In Example 131, the subject matter of Example 130 can optionally include wherein the probabilistic model estimates the probable timing of a retransmission relative to an initial transmission by the mobile communication network.

In Example 132, the subject matter of Example 130 or 131 can optionally include wherein the calculating the probabilistic model based on the monitored retransmissions includes for each of the monitored retransmissions, determining a retransmission delay time between the monitored transmission and a corresponding initial transmission by the mobile communication network, and determining the number of occurrences of each possible retransmission delay time based on the determined retransmission delay times.

In Example 133, the subject matter of Example 132 can optionally include wherein the calculating the probabilistic model based on the monitored retransmissions further includes calculating the probabilistic model with the number of occurrences of each possible retransmission delay time and the total number of monitored retransmissions.

In Example 134, the subject matter of any one of Examples 118 to 133 can optionally include wherein the probabilistic model estimates the probable timing of a retransmission relative to an initial transmission by the mobile communication network.

In Example 135, the subject matter of Example 118 can optionally include wherein the one or more baseband modems are further configured to identify one or more missed subframes of the first radio connection, and wherein the scheduling radio operations of the second radio connection based on the probabilistic model includes scheduling radio activity of the second radio connection during a subframe of the first radio connection that has a low probability of containing a data block of the one or more missed subframes of the first radio connection according to the probabilistic model.

In Example 136, the subject matter of Example 135 can optionally include wherein the identifying one or more missed subframes of the first radio connection includes identifying one or more subframes of the first radio connection that are missed due to a scheduled radio gap of the first radio connection as missed subframes of the one or more missed subframes, or identifying one or more subframes of the first radio connection that are missed due to unsuccessful reception as missed subframes of the one or more missed subframes.

In Example 137, the subject matter of any one of Examples 118 to 136 can optionally include wherein the one or more baseband modems are configured to allow only one of either the first radio connection or the second radio connection to receive data at a time.

In Example 138, the subject matter of any one of Examples 118 to 137 can optionally include wherein the mobile terminal device is configured according to a Dual-SIM Dual-Standby (DSDS) design, and wherein the first radio connection is a radio connection of a first SIM of the mobile communication device and the second radio connection is a radio connection of a second SIM of the mobile communication device.

In Example 139, the subject matter of any one of Examples 118 to 137 can optionally further include a first SIM and a second SIM, wherein the first radio connection is a radio connection of the first SIM and the second radio connection is a radio connection of the second SIM.

In Example 140, the subject matter of any one of Examples 118 to 139 can optionally include wherein the first radio connection is in a radio active state and the second radio connection is in a radio idle state.

In Example 141, the subject matter of any one of Examples 118 to 140 can optionally include wherein the first radio connection is a radio connection for a Long Term Evolution (LTE) radio access technology, a Universal Mobile Telecommunications System (UMTS) radio access technology, a Global System for Mobile Communications (GSM) radio access technology, a Bluetooth radio access technology, or a WiFi radio access technology.

In Example 142, the subject matter of any one of Examples 118 to 141 can optionally include wherein the second radio connection is a radio connection for a Long Term Evolution (LTE) radio access technology, a Universal Mobile Telecommunication System (UMTS) radio access technology, a Global System for Mobile Communications (GSM) radio access technology, a Bluetooth radio access technology, or a WiFi radio access technology.

In Example 143, the subject matter of any one of Examples 118 to 142 can optionally include wherein the first radio connection is connected to the mobile communication network and the second radio connection is connected to a different mobile communication network than the first radio connection.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device comprising:
   a radio processing circuit configured to receive and process radio frequency signals; and
   one or more baseband modems configured to:
   identify a missed subframe of a first radio connection;
   select a subframe from one or more additional subframes of the first radio connection during which to schedule radio activity of a second radio connection based on a probability metric for each of the one or more additional subframes, where the probability metric for each given subframe of the one or more additional subframes indicates a probability that the subframe contains a data block of the missed subframe; and perform the scheduled radio activity of the second radio connection during the selected subframe of the first radio connection.

2. The mobile terminal device of claim 1, wherein the performing the scheduled radio activity of the second radio connection during the selected subframe causes the one or more baseband modems to miss reception of the selected subframe of the first radio connection.

3. The mobile terminal device of claim 1, wherein the one or more baseband modems are further configured to:
schedule a radio gap for the first radio connection during the missed subframe of the first radio connection; and
perform further radio activity for the second radio connection during the scheduled radio gap for the first radio connection.

4. The mobile terminal device of claim 3, wherein the performing further radio activity for the second radio connection during the scheduled radio gap for the first radio connection comprises:
receiving a paging message, a system information message, or performing a radio measurement for the second radio connection during the scheduled radio gap for the first radio connection.

5. The mobile terminal device of claim 1, wherein the probability metric for each given subframe of the one or more additional subframes indicates the probability that the subframe contains an initial transmission or a retransmission of a data block of the first subframe.

6. The mobile terminal device of claim 1, wherein the selecting a subframe from one or more additional subframes of the first radio connection during which to schedule radio activity of the second radio connection based on a probability metric for each of the one or more additional subframes comprises:
selecting a subframe from the one or more additional subframes of the first radio connection that has a minimum probability metric as the selected subframe, where low probability metrics indicate a low probability that a given subframe of the one or more additional subframes of the first radio connection contains a data block of the missed subframe.

7. The mobile terminal device of claim 1, wherein the one or more baseband modems are further configured to:
miss reception of a further subframe of the first radio connection, wherein the probability metric for each given subframe of the one or more additional subframes indicates a cumulative probability that the subframe contains a data block of the missed subframe or a data block of the further subframe.

8. The mobile terminal device of claim 1, wherein the identifying a missed subframe of the first radio connection comprises:
identifying a subframe of the first radio connection that is missed due to a scheduled radio gap of the first radio connection as the missed subframe; or
identifying a subframe of the first radio connection that is missed due to unsuccessful reception as the missed subframe.

9. The mobile terminal device of claim 1, wherein the one or more baseband modems are further configured to:
monitor retransmissions for the first radio connection during an observation time period; and
calculate the probability metric for each of the one or more additional subframes of the first SIM based on the monitored retransmissions.

10. The mobile terminal device of claim 9, wherein the calculating the probability metric for each of the one or more additional subframes of the first radio connection based on the monitored retransmissions comprises:
for each of the monitored retransmissions, determining a retransmission delay time between the monitored transmission and a corresponding initial transmission; and
calculating the probability metric for each of the one or more additional subframes of the first radio connection based on the retransmission delay time for each of the monitored retransmissions.

11. The mobile terminal device of claim 1, further comprising a first SIM and a second SIM, wherein the first radio connection is a radio connection of the first SIM and the second radio connection is a radio connection of the second SIM.

12. A method in a mobile communication device comprising:
identifying a missed subframe of a first radio connection;
selecting a subframe from one or more additional subframes of the first radio connection during which to schedule radio activity of a second radio connection based on a probability metric for each of the one or more additional subframes, where the probability metric for each given subframe of the one or more additional subframes indicates a probability that the subframe contains a data block of the missed subframe; and
performing the scheduled radio activity of the second radio connection during the selected subframe of the first radio connection.

13. The method of claim 12, wherein the probability metric for each given subframe of the one or more additional subframes indicates the probability that the subframe contains an initial transmission or a retransmission of a data block of the first subframe.

14. The method of claim 12, wherein the selecting a subframe from one or more additional subframes of the first radio connection during which to schedule radio activity of a second radio connection based on a probability metric for each of the one or more additional subframes comprises:
selecting a subframe from the one or more additional subframes of the first radio connection that has a minimum probability metric as the selected subframe, where low probability metrics indicate a low probability that a given subframe of the one or more additional subframes of the first radio connection contains a data block of the missed subframe.

15. A method in a mobile communication device, the method comprising:
missing a first subframe of an active radio connection;
selecting a second subframe from one or more additional subframes of the active radio connection based on a probability metric for each of the one or more additional subframes, wherein the probability metric for each given subframe of the one or more additional subframes indicates a probability that the subframe contains a data block of the first subframe; and
scheduling radio activity of an idle radio connection during the second subframe of the active radio connection.

16. The method of claim 15, wherein the probability metric for each given subframe of the one or more additional subframes indicates a probability that the subframe contains an initial transmission or a retransmission of a data block of the first subframe.

17. A mobile terminal device comprising:
a radio processing circuit configured to receive and process radio frequency signals; and
one or more baseband modems configured to:
monitor retransmissions from a mobile communication network for an active radio connection during an observation time period;
determine a probabilistic model that characterizes a retransmission strategy of the mobile communication network based on the monitored retransmissions; and
schedule radio operations of a second radio connection based on the probabilistic model.

18. The mobile terminal device of claim 17, wherein the one or more baseband modems are further configured to:
identify a missed subframe of the first radio connection;
select a subframe of the first radio connection having a low probability of containing a data block of the missed subframe according to the probabilistic model; and
scheduling a radio activity of the second radio connection during the selected subframe.

19. The mobile terminal device of claim 18, wherein the one or more baseband modems are further configured to:
perform the scheduled radio activity of the second radio connection during the selected subframe, wherein the performing the scheduled radio activity of the second radio connection causes the first radio connection to miss the selected subframe.

20. The mobile terminal device of claim 17, wherein the one or more baseband modems are further configured to:
determine a probability metric for one or more additional subframes of the first radio connection based on the probabilistic model, where the probability metric for each given subframe of the one or more additional subframes indicates a probability that the subframe contains a data block of a missed subframe of the first radio connection.

21. The mobile terminal device of claim 20, wherein the scheduling radio operations of the second radio connection based on the probabilistic model comprises:
selecting a subframe from the one or more additional subframes of the first radio connection to schedule radio activity for the second radio connection based on the probability metric of each of the one or more additional subframes; and
scheduling a radio gap for the first radio connection during the selected subframe.

22. The mobile terminal device of claim 17, wherein the scheduling radio operations of the second radio connection based on the probabilistic model comprises:
selecting a subframe from the one or more additional subframes of the first radio connection during which to schedule radio activity for the second radio connection based on the probabilistic model, wherein the selected subframe has a low probability of containing a data block of a missed subframe of the first radio connection according to the probabilistic model.

23. The mobile terminal device of claim 22, wherein the one or more baseband modems are further configured to:
schedule a radio gap for the first radio connection during the selected subframe; and
perform the scheduled radio activity for the second radio connection during the selected subframe.

24. The mobile terminal device of claim 17, wherein the determining a probabilistic model that characterizes a retransmission strategy of the mobile communication network comprises:
monitoring retransmissions from the mobile communication network for the first radio connection during an observation time period; and
calculating the probabilistic model based on the monitored retransmissions.

25. The mobile terminal device of claim 24, wherein the calculating the probabilistic model based on the monitored retransmissions comprises:
for each of the monitored retransmissions, determining a retransmission delay time between the monitored transmission and a corresponding initial transmission by the mobile communication network; and
determining the number of occurrences of each possible retransmission delay time based on the determined retransmission delay times.

* * * * *